(12) United States Patent
Black et al.

(10) Patent No.: US 6,377,561 B1
(45) Date of Patent: Apr. 23, 2002

(54) DATA COMMUNICATION SATELLITE SYSTEM AND METHOD OF CARRYING MULTI-MEDIA TRAFFIC

(75) Inventors: Colin J. Black, St. Lazare; Peter Takats, Ile Perrot; Martin Cote, Montreal; Tho T. Le-Ngoc, Anjou, all of (CA)

(73) Assignee: Spar Aerospace Limited, Mississauga (CA)

( * ) Notice: Subject to any disclaimer, the term of this patent is extended or adjusted under 35 U.S.C. 154(b) by 0 days.

(21) Appl. No.: 08/669,609

(22) Filed: Jun. 24, 1996

(51) Int. Cl.[7] .................................................. H04J 3/24
(52) U.S. Cl. ...................................................... 370/330
(58) Field of Search ................................. 370/218, 316, 370/317, 318, 321, 323, 325, 330, 398, 399, 422, 430, 436, 437, 395, 411, 412–418, 444, 311, 350, 349, 347, 346, 345, 337, 312, 314, 389, 393, 390, 449, 461, 462, 447, 442, 455; 340/825.5, 825.01, 825.51, 825.52

(56) References Cited

U.S. PATENT DOCUMENTS

| | | | | |
|---|---|---|---|---|
| 3,634,628 A | * | 1/1972 | Sekimoto | |
| 4,813,036 A | * | 3/1989 | Whitehead | |
| 4,931,802 A | * | 6/1990 | Assal et al. | 342/356 |
| 4,941,199 A | * | 7/1990 | Saam | 455/10 |
| 5,274,627 A | * | 12/1993 | De Santis | |
| 5,519,704 A | * | 5/1996 | Farinacci et al. | 370/402 |
| 5,555,443 A | * | 9/1996 | Ikehama | 455/12.1 |
| 5,579,307 A | * | 11/1996 | Richetta et al. | |
| 5,619,211 A | * | 4/1997 | Harkin et al. | 342/352 |
| 5,724,358 A | * | 3/1998 | Headrick et al. | 370/418 |
| 5,894,473 A | * | 4/1999 | Dent | 370/320 |

\* cited by examiner

Primary Examiner—Dang Ton
(74) Attorney, Agent, or Firm—Alix, Yale & Ristas, LLP

(57) ABSTRACT

A satellite data communication system and method of operating the same is disclosed. The satellite data communication system provides switched transport services for multi-media networks, wherein access schemes, protocols and switching techniques are combined to offer optimized dynamic bandwidth-on-demand on a cell-by-cell basis.

43 Claims, 22 Drawing Sheets

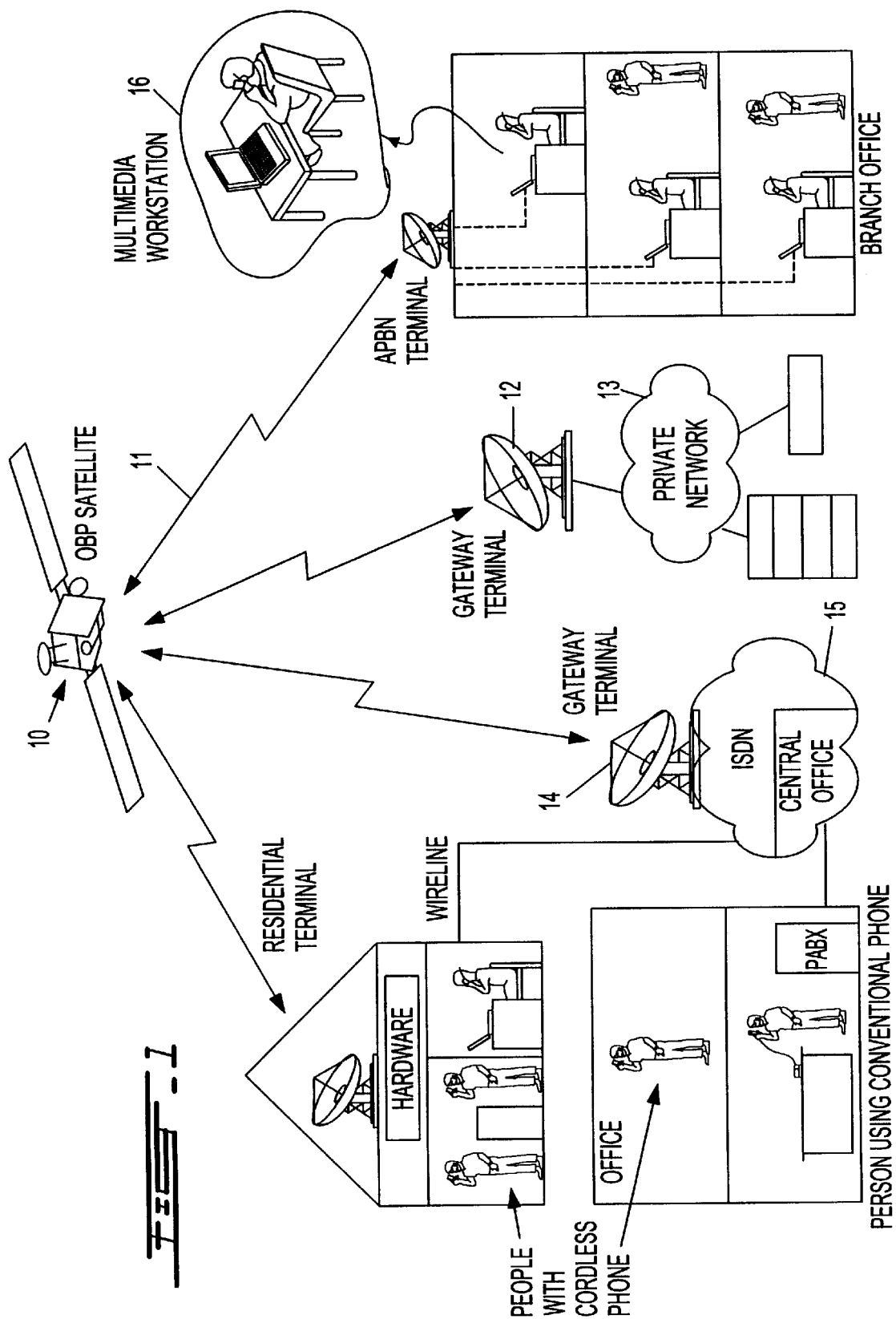

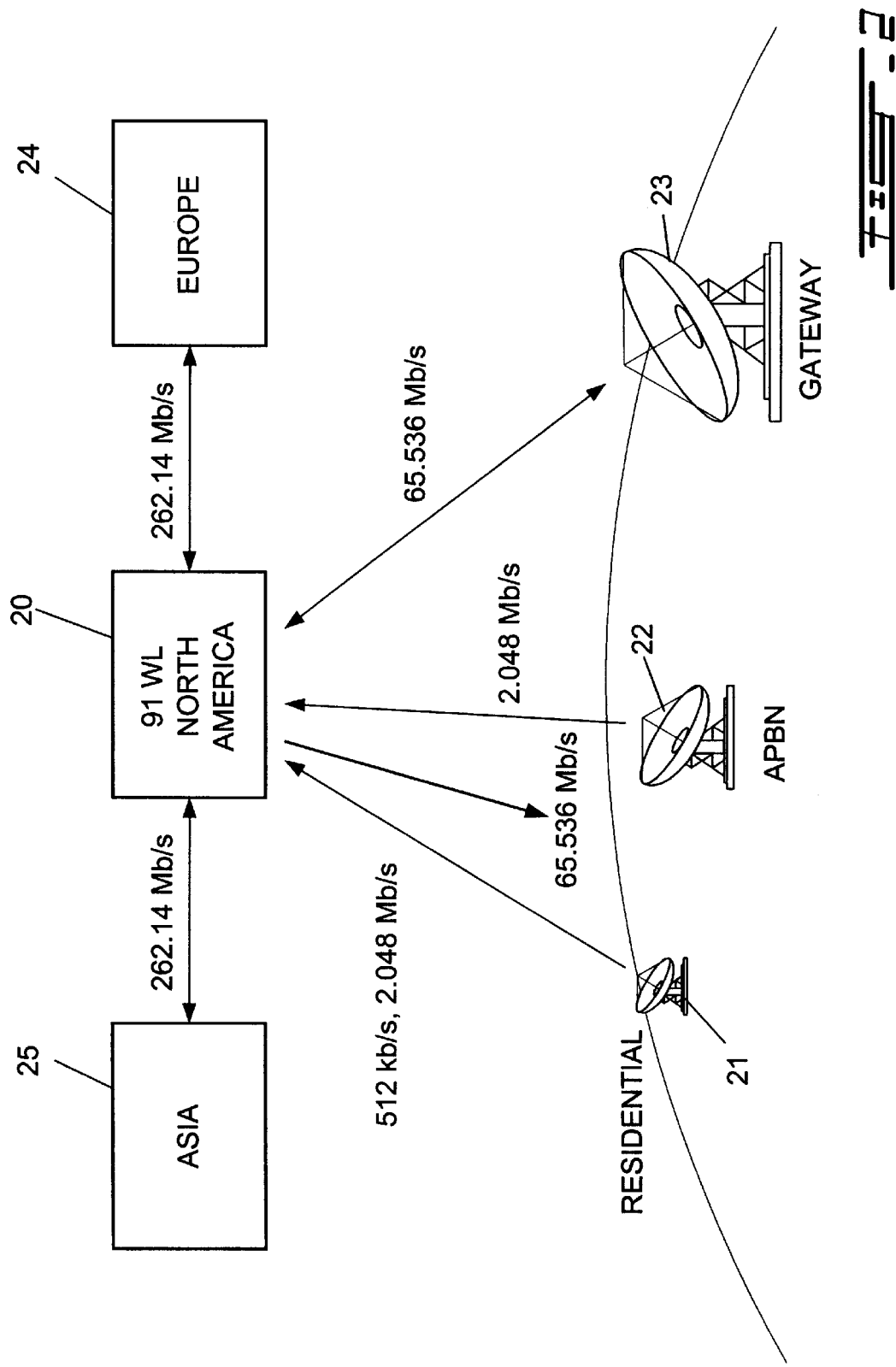

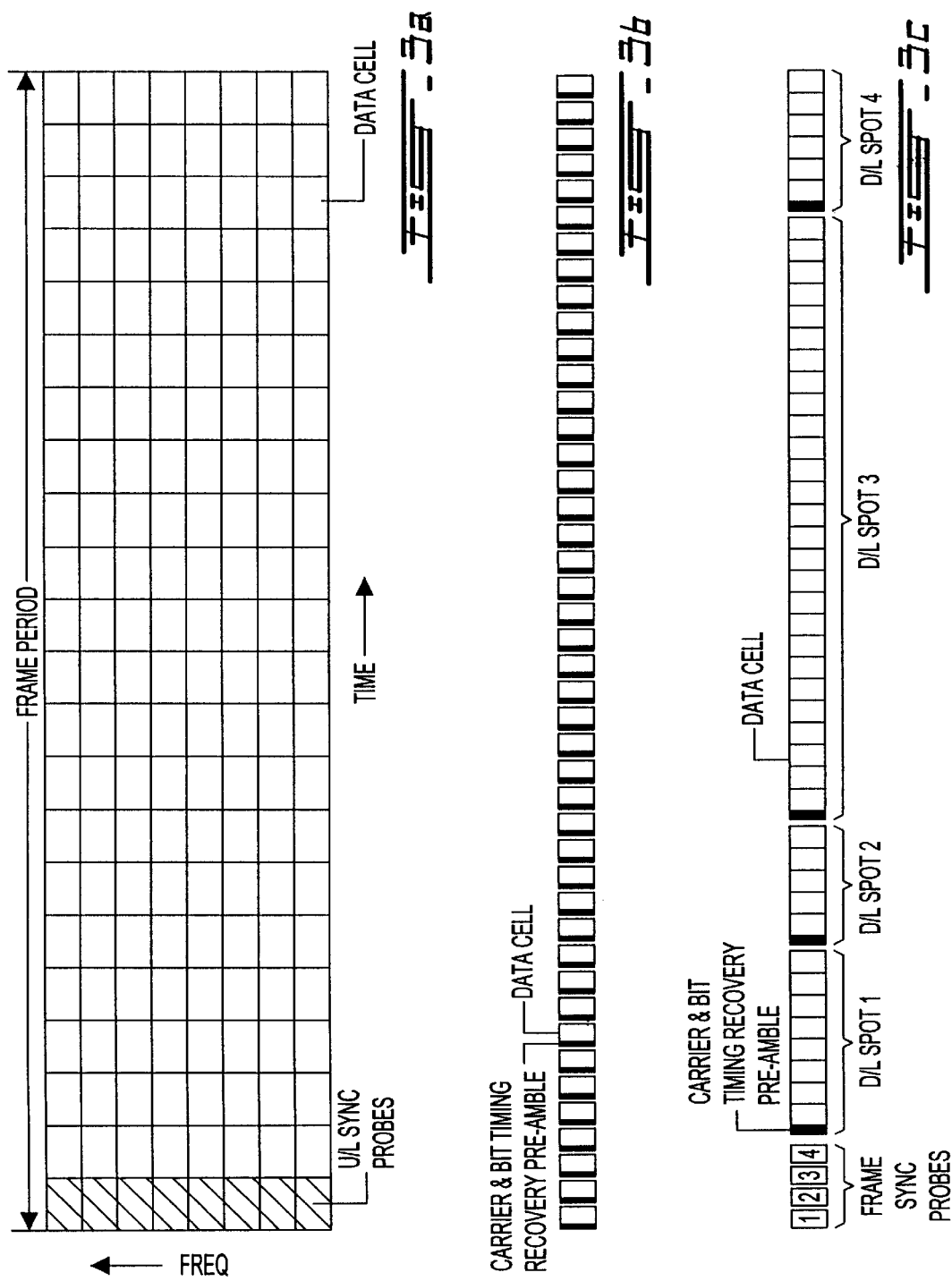

○ "A" Linear 4-Beam Groups

Uplink:

A:  19.700 – 19.820 LHC      19.820 – 19.940 RHC
B:  19.820 – 19.940 LHC      19.940 – 20.060 RHC
C:  19.940 – 20.060 LHC      20.060 – 20.180 RHC
D:  20.060 – 20.180 LHC      19.700 – 19.820 RHC

Downlink:

A:  29.500 – 29.620 LHC      29.620 – 29.740 RHC
B:  29.620 – 29.740 LHC      29.740 – 29.860 RHC
C:  29.740 – 29.860 LHC      29.860 – 29.980 RHC
D:  29.860 – 29.980 LHC      29.500 – 29.620 RHC

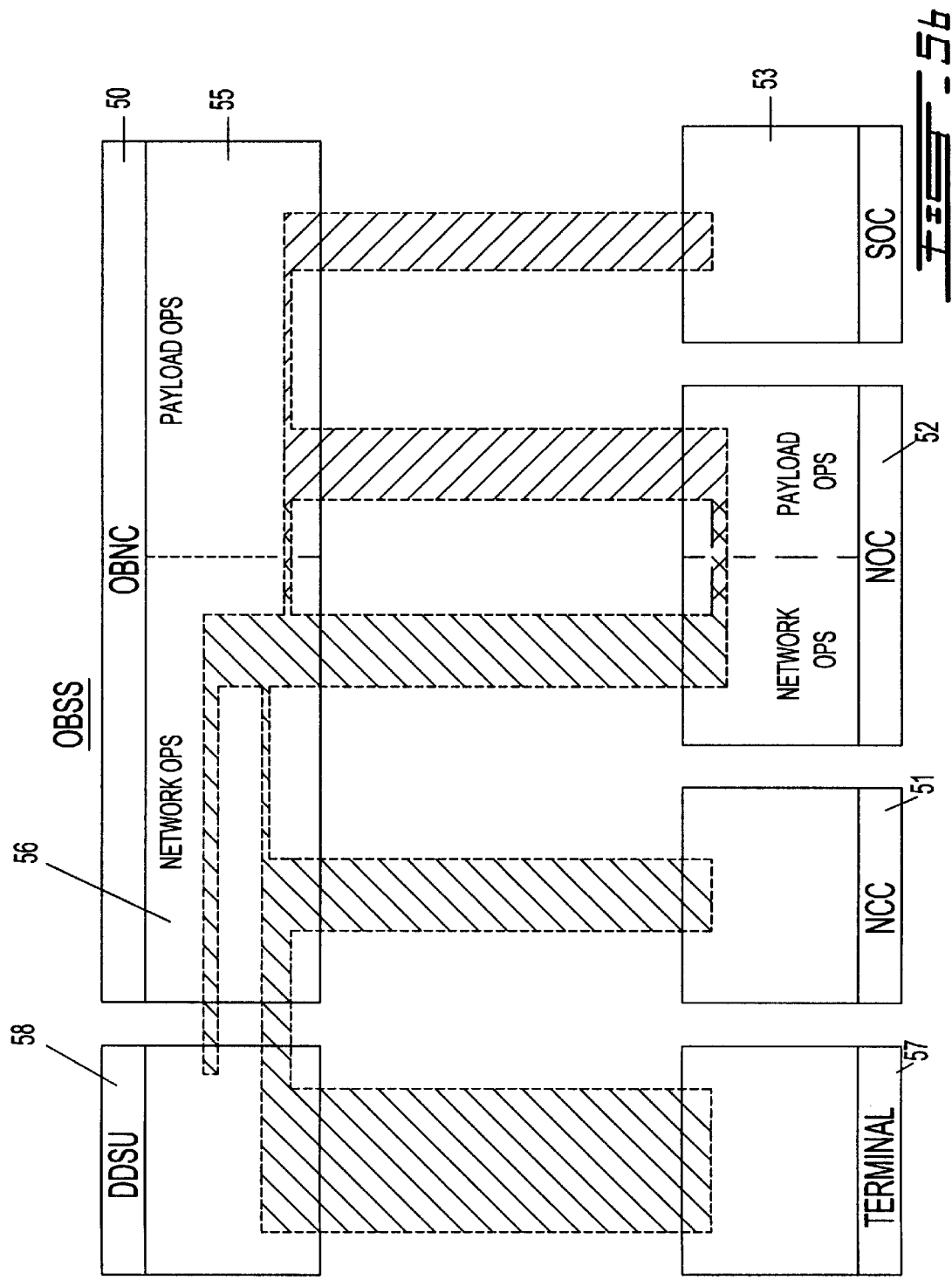

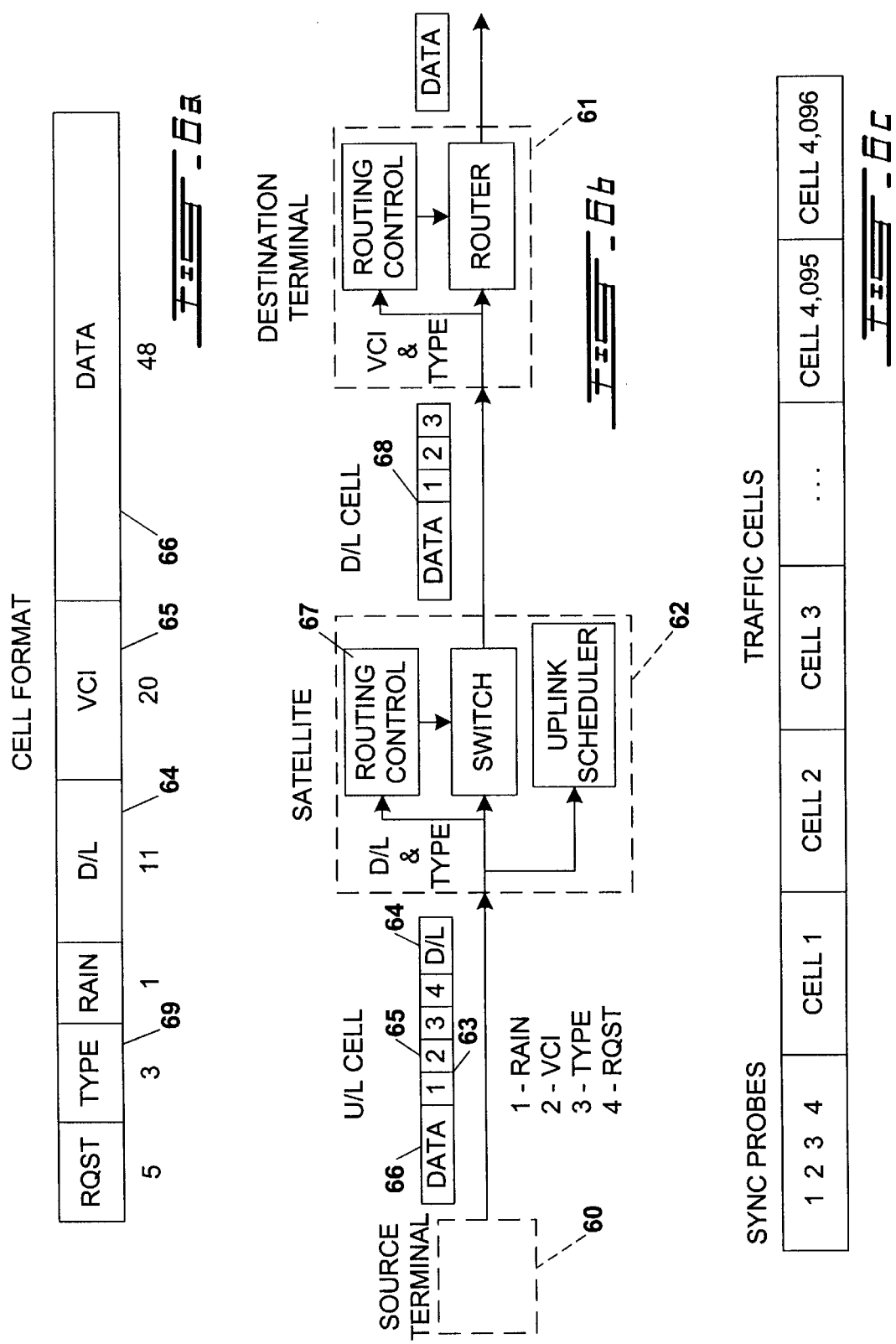

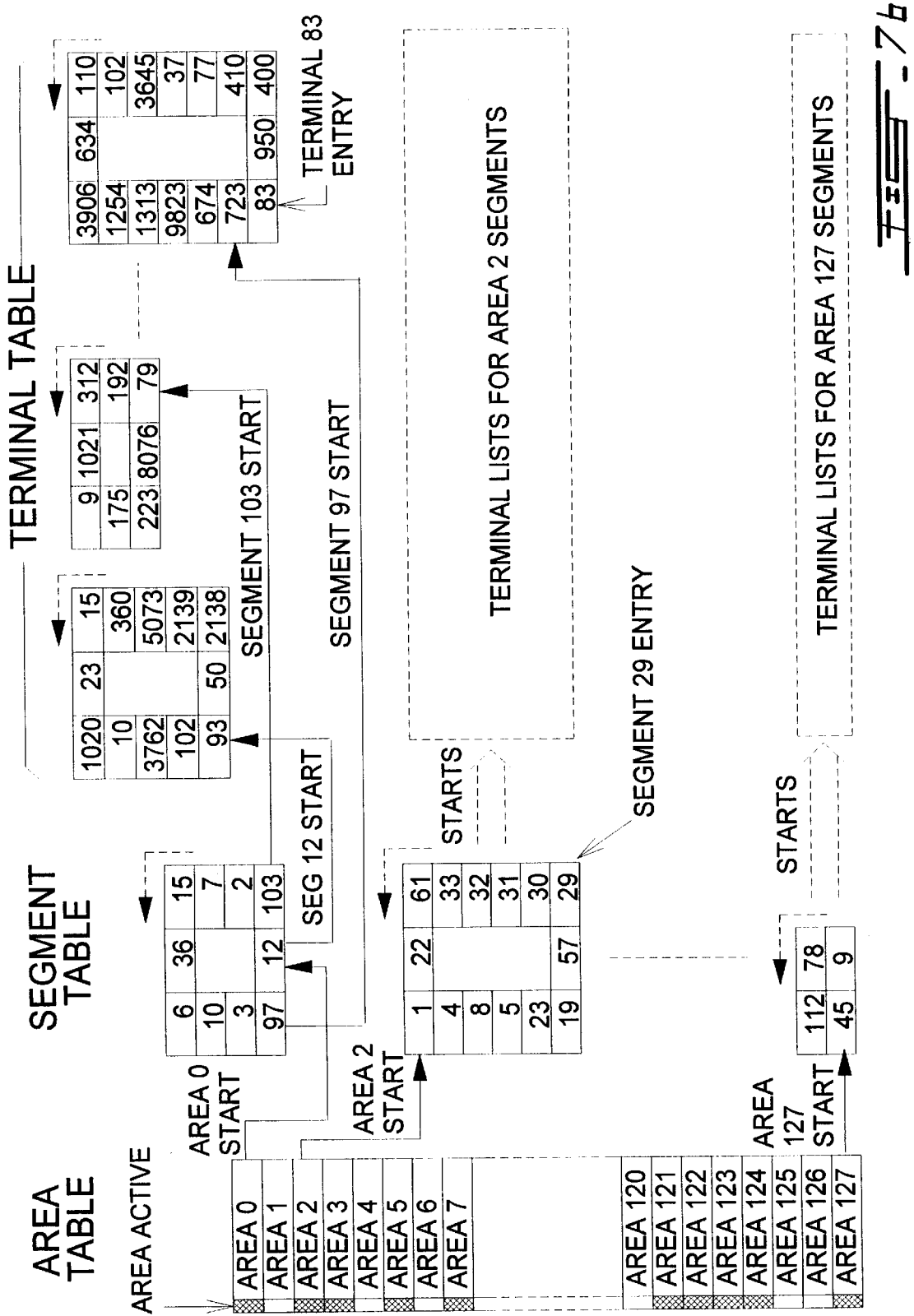

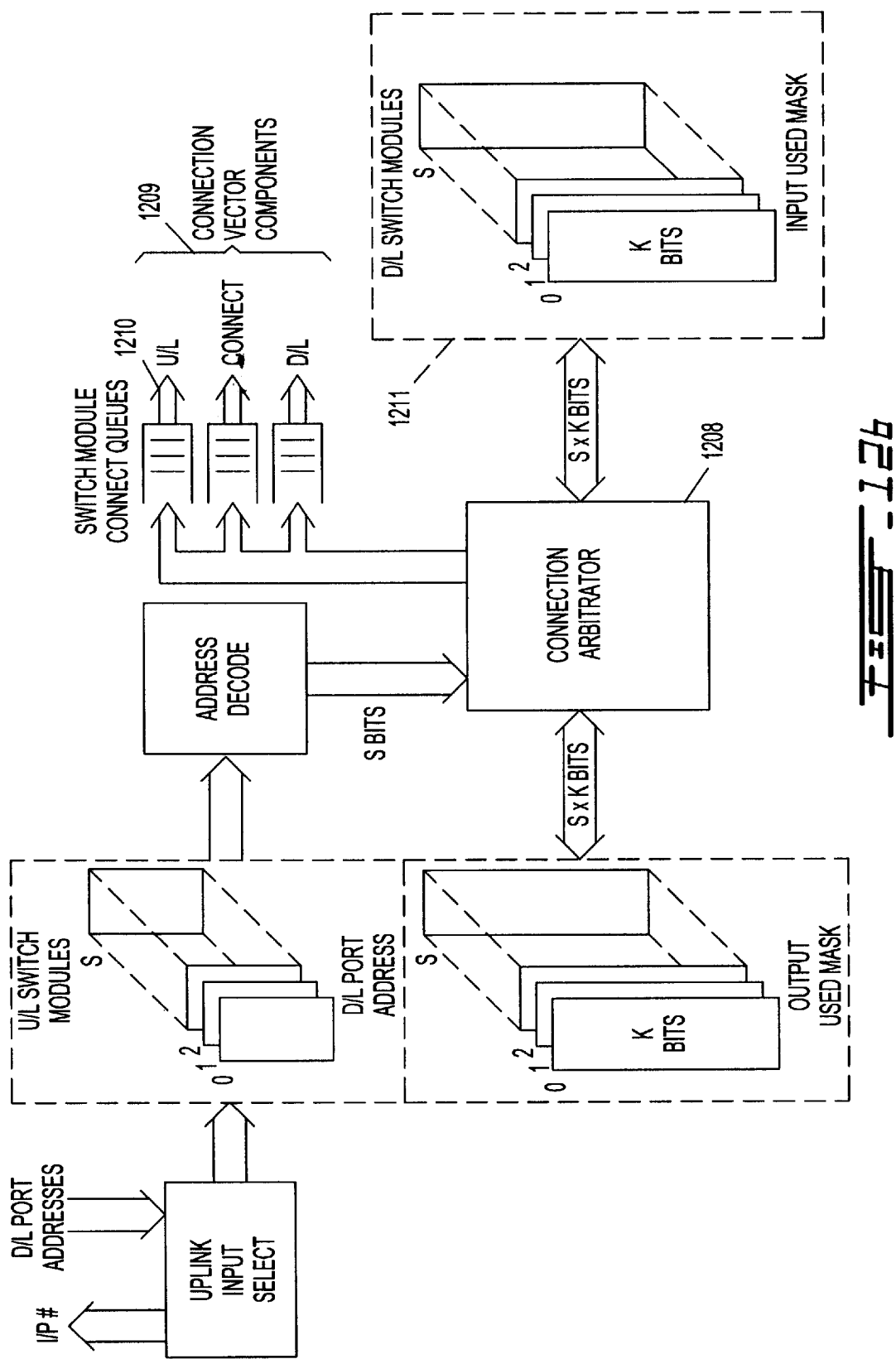

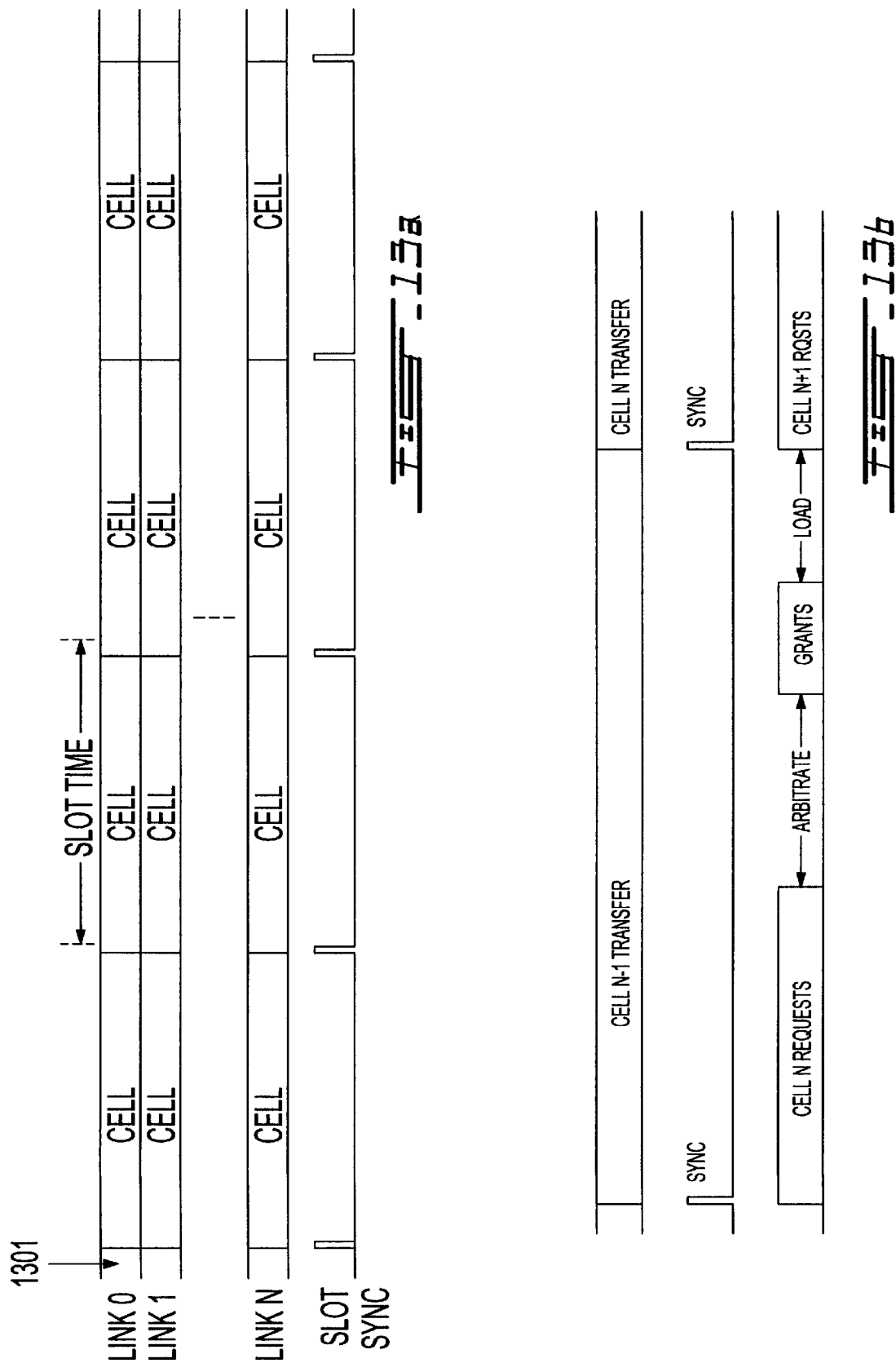

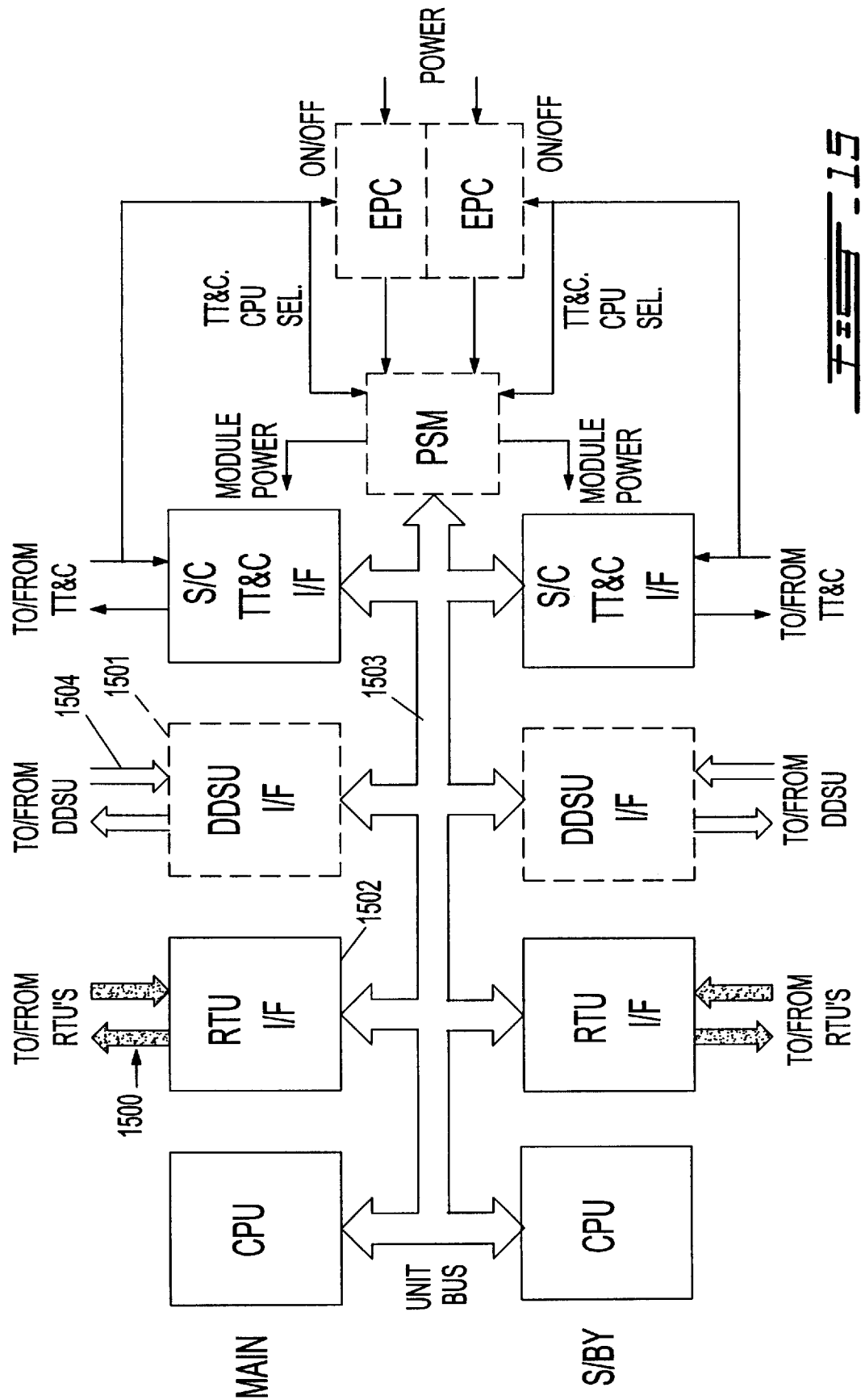

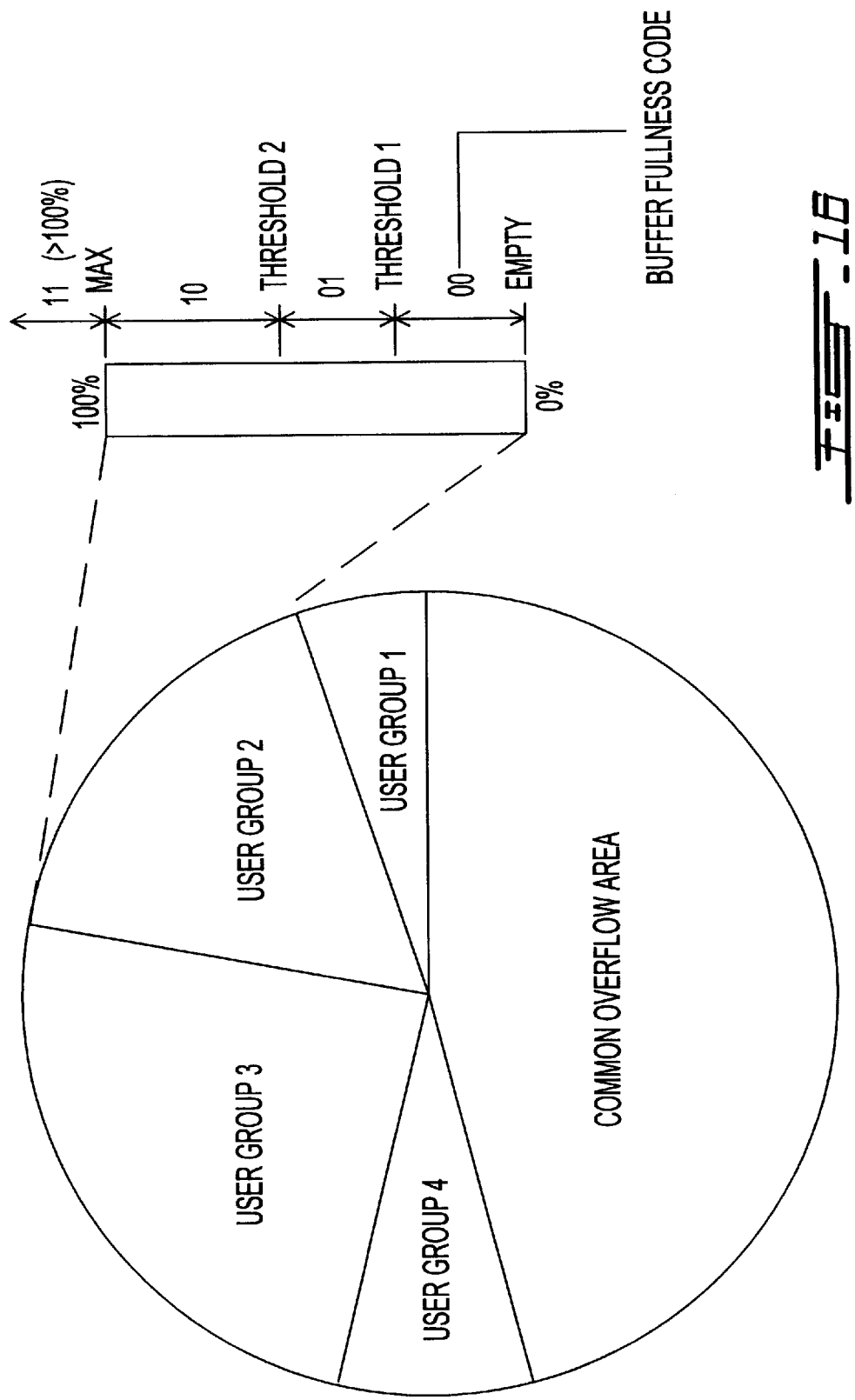

DATA COMMUNICATION SATELLITE SYSTEM AND METHOD OF CARRYING MULTI-MEDIA TRAFFIC

FIELD OF THE INVENTION

This invention relates to data communication satellites, and more particularly to data communication satellites capable of providing two-way multi-media communications with residential and small business satellite terminals.

BACKGROUND OF THE INVENTION

Existing trends in satellite communications suggest that a shift is occurring to offer services to multi-media traffic. Current satellite data services are geared to users who generate steady-stream data. Although these services can be used to transport multi-media traffic, compromises on the channel quality and efficiency must be made. If the data channels are fitted to operate at peak data rates, the channel usage becomes very inefficient. If the channel is sized to the average traffic rate, clipping will result. A means of supporting bandwidth-on-demand is therefore being considered to optimize multi-media services.

Since these new traffic sources are bursty by nature, the ratio between peak and average channel use can be in the order of two magnitudes. The efficient support of multi-media traffic sources will demand that spare capacity be shared between all users and applications. Because of the non-uniform nature of the expected traffic, fast-packet switching techniques have been identified as the best means of switching traffic amongst the user population. For example, data communication satellites are targeted at supporting multi-media traffic efficiently, which means handling traffic with varying Jitter Tolerance, Cell Loss Tolerance, Circuit Set-up (Access), Latency and Source Burstiness.

Some classes of traffic cannot tolerate cell loss or jitter, but have low burstiness and can tolerate relatively long call set-up delays. (Examples are standard telephones, stream data and Constant Bit Rate (CBR) video). These require emulating a conventional fixed circuit assignment, and are classified as Real Time (RT) data.)

At the other extreme is packet data, which has very high burstiness (typically 400:1 ratios of burst to average rate) and requires a short access latency, but can tolerate transmission jitter and cell loss (using ARQ Recovery Protocols). Carrying this class of traffic efficiently requires bandwidth-on-demand protocols with a short response time to individual bursts (less than one second). Such traffic is classified as Jitter Tolerant (JT) data. There is a third class, representing compressed/statistically multiplexed voice and Variable Bit Rate (VBR) video which requires a guaranteed no-loss connection which has moderate burstiness, can tolerate a relatively long circuit set-up time but which requires very short response (less than a few milliseconds) to transient burst. Because this class covers compressed data, with a significant decompression processing delay, it should be able to tolerate minor jitter in transmission, and is referred to here as Near Real Time (NRT) data.

To handle these diverse requirements over a geostationary satellite, with its inherent long round trip propagation delay of about a quarter-second, requires a very efficient uplink access protocol and responsive capacity assignment algorithm. These and other fundamental network requirements need to be addressed in order to efficiently support multi-media traffic. With the increasing amount of information required to support each multi-media user, efficient use of network capacity, even in terrestrial networks, is required as evidenced by the emergence of the ATM standard for multiplexing and switching. For a satellite network the efficient use of bandwidth is even more imperative due to physical limitations and cost of establishing that resource in space orbit.

Thus, satellite-based multi-media data services can only be implemented efficiently if the concept of bandwidth-on-demand is optimized.

The concept of "bandwidth-on-demand" simply refers to allocating bandwidth to a user when it is required, and in its most dynamic form, matching the instantaneous bandwidth variation of the source traffic profile. This in turn permits a greater efficiency of bandwidth utilization by statistical multiplexing of traffic, thereby increasing the number of users that the system can simultaneously support. Although Demand Assignment, Multiple Access (DAMA) systems have been offered in the past to provide bandwidth-on-demand on a call-by-call basis, i.e. circuit assignment, these have been found to be unsuitable for offering bandwidth-on-demand for a satellite-based fast-packet switch.

Accordingly, a need exists for providing a satellite data communication system and method of operating the same in order to provide switch transport services for multi-media networks, wherein access schemes, protocols and switching techniques are combined to offer optimized dynamic bandwidth-on-demand on a packet-by-packet basis.

OBJECTS OF THE INVENTION

It is therefore an object of the present invention to provide a data communication satellite system capable of carrying multi-media traffic with varying jitter and cell loss tolerances, circuit set-up time, latency and source burstiness.

Another object of the present invention is to provide a data communication satellite system with an efficient uplink access protocol with responsive capacity assignment algorithm.

Another object of the present invention is to provide a data communication satellite system which make use of an on-board ATM-like switch capable of providing bandwidth-on-demand.

Yet another object of the present invention is to provide a data communication satellite system which makes use of a beam grouping management technique to enable flexible resource allocation.

Another object of the present invention is to provide a data communication satellite system which utilizes rain fade countermeasures for uplink and downlink transmissions.

SUMMARY OF THE INVENTION

According to one aspect of the present invention, there is provided in a satellite communication system carrying data traffic between a data communication satellite and plurality of ground terminals, a method of allocating bandwidth resources amongst a number of spot beams used by said data communication satellite to establish uplink and downlink communication carriers with said ground terminals, comprising the steps:

assigning a predetermined frequency reuse pattern to a number of spot beams forming a geometric configuration of beam groups covering said plurality of ground terminals;

distributing the available bandwidth between each beam group such that a downlink carrier of predetermined bandwidth is shared between spot beams forming said beam group; and allocating a predetermined amount of transmission time on said downlink carrier to each spot beam, according the traffic density and bandwidth requirements of each spot beam In another aspect of the present invention there is provided an improved satellite communication system for carrying data traffic between a data communication satellite and a plurality of ground terminals, each ground terminal being operable in a spot beam for communicating with said data communication satellite over uplink and downlink carriers, wherein the improvement comprises:

each ground terminal being operable to communicate with said data communication satellite via an uplink MF-TDMA carrier having a signal bandwidth which is distributed pseudo-statically in an integral number of carriers with a minimum capacity of one, carrier in each spot beam; and each ground terminal being operable to communicate with said data communication satellite via a downlink TDM cell burst which vary dynamically in length from frame to frame according to the traffic requirements of each spot beam.

In yet another aspect of the present invention there is provided in a satellite communication system for carrying data traffic between a source terminal and a destination terminal via a data communication satellite having an on-board switching system, a method of routing data packets through said on-board switching system, comprising:

receiving, at said on-board switching system, a data packet from said source terminal, said data packet having an information field and traffic routing fields;

decoding a DownLink address (D/L) from said traffic routing fields to determine the destination of said received data packet;

transmitting said received data packet to an appropriate downlink carrier according to said decoded D/L address;

receiving at said destination terminal, said data packet; and decoding a Virtual Circuit Identifier (VCI) from said traffic routing fields to identify which cells of said data packet are applicable to said destination terminal.

In yet another aspect of the present invention there is provided in a satellite communication system for carrying data traffic between a source terminal and a destination terminal via a data communication satellite having an on-board switching system, a method of scheduling cell priority of data packets carried on a downlink carrier established between said data communication satellite and said destination terminal, comprising:

receiving, at said on-board switching system, a data packet from said source terminal, said data packet having a cell type field indicative of cell priority to be allocated to the received data packet;

decoding said cell type field from said data packet to determine the cell type; and transmitting said received data packet via an appropriate downlink carrier to a destination terminal according to the cell type identified with said data packet.

In yet another aspect of the present invention there is provided in a satellite communication system carrying data traffic between a data communication satellite and plurality of ground terminals, a method of dynamically reducing the effects of rain fade on uplink and downlink communication carriers established between said data communication satellite and said ground terminals, comprising the step:

receiving a transmitted signal via one of said uplink and downlink communication carriers;

measuring the power level of the received signal;

identifying that said transmitted signal is being subjected to rain fading;

determining the level of rain fading; and applying a rain fade countermeasure to said transmitted signal.

BRIEF DESCRIPTION OF THE DRAWINGS

The invention will be better understood by an examination of the following description, together with the accompanying drawings, in which:

FIG. 1 is an illustration providing a general overview of the multi-media traffic which can make use of the system of the present invention;

FIG. 2 is an illustration showing a general overview of the system of the present invention;

FIGS. 3a, 3b and 3c are diagrams illustrating the transmission formats used on the uplink and downlink paths of the system of the present invention;

FIG. 5b is a diagram illustrating the overall system component interaction;

FIG. 6a is a diagram illustrating a typical cell format carried on an uplink carrier;

FIG. 6b is a block diagram illustrating a general outline of the cell routing pattern between a source terminal and a destination terminal;

FIG. 6c is a diagram illustrating the frame structure of traffic cells on the downlink carrier;

FIG. 7b is a representation of the linking structure between the tables illustrated in FIG. 7a;

FIG. 8b is a block diagram of the Destination Directed Switching Unit (DDSU) for use in the system of FIG. 8a;

FIG. 12b is a block diagram illustrating the connection process provided by the S stage controller of FIG. 12a;

FIG. 13a is a diagram illustrating the S stage transfer formatting;

FIG. 13b is a diagram illustrating the S stage transfer protocol;

FIG. 15 is a block diagram illustrating the flow of information within the On-Board Network Controller (OBNC); and FIG. 16 is a diagram illustrating flow buffer partitioning.

DESCRIPTION OF THE PREFERRED EMBODIMENTS

Figure 4A:
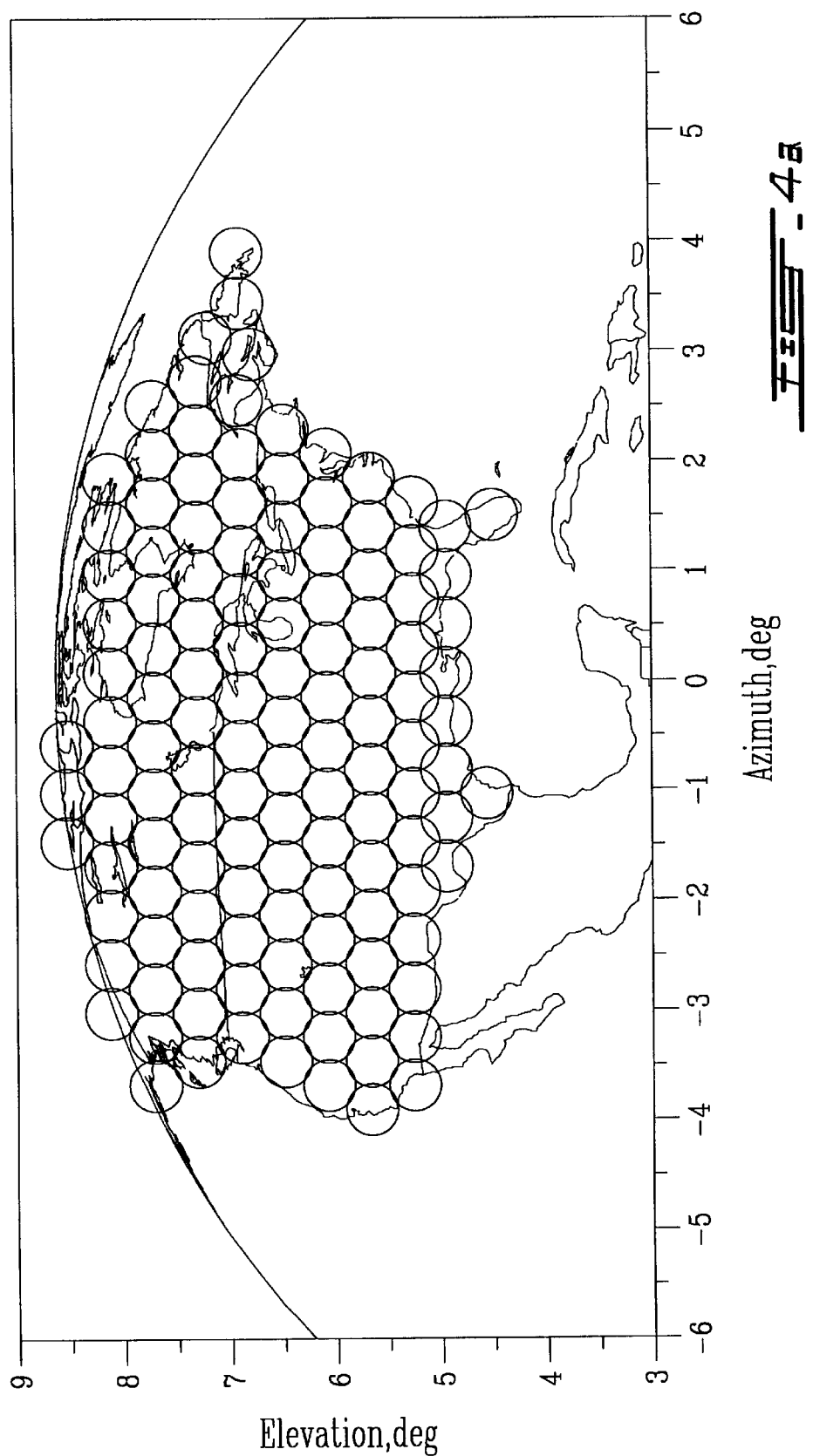
FIG. 4a is a diagram illustrating generally how spot beam layout can be provided for North America.

In order to lighten up the following description, the following acronyms will be used:

| | |
|---|---|
| AFEC | Adaptive Forward Error Correction; |
| APBN | Advanced Private Business Network; |
| ARQ | Recovery Protocols; |
| ATM | Asynchronous Transfer Mode; |
| AVR | Absolute Volume Request; |
| B-ISDN | Broadband Integrated Services Digital Network; |
| BTP | Burst-Time Plan; |
| CBR | Constant Bit Rate; |
| CDMA | Code Division Multiple Access; |
| CFDAMA | Combined Free and Demand Assigned Multiple Access; |
| CMOS | Complementary Metal Oxide Semiconductor; |
| CSC | Common Signalling Channel; |
| DAMA | Demand Assignment, Multiple Access; |
| DDSU | Destination Directed Switching Unit; |
| D/L | DownLink; |
| EVRUCA/PIBRIE | Explicit Volume Requests with Uncommitted Capacity Assignment/PIggy-Backed Requests for Initial Entry; |
| FCA | Free Capacity Assignment; |
| FDMA | Frequency Division Multiple Access; |
| FEC | Forward Error Correction; |
| HK | HouseKeeping; |
| IBR | In Band Request; |
| ISDN | Integrated Services Digital Network; |
| JT | Jitter Tolerant; |
| MC-TDMA | Multi-Code Time Division Multiple Access; |
| MCDDD | Multi-Carrier Demultiplexing, Demodulation and Decoding; |
| MF-TDMA | Multi-Frequency Time Division Multiple Access; |
| NCC | Network Control Centre; |
| N-ISDN | Narrow Band Integrated Services Digital Network; |
| NOC | Network Operations Centre; |
| NRT | Near Real Time; |
| OBNC | On-Board Network Controller; |
| OBR | Out of Band Request; |
| OBSS | On-Board Switching System; |
| OSI | Open System Intereconnection; |
| QPSK | Quadrature Phase Shift Keying; |
| RAM | Random Access Memory; |
| rfcm | rain fade countermeasures; |
| RISC | Reduced Instruction Set Computer; |
| RQST | Uplink Capacity Request; |
| RS | Reed Solomon; |
| RT | Real Time; |
| SOC | Satellite Operations Centre; |
| TCP | Transfer Control Protocol; |
| TCP/IP | Transfer Control Protocol/Internet Protocol; |
| TDM | Time Division Multiplexing; |
| TDMA | Time Division Multiple Access; |
| TST | Time Space Time; |
| U/L | UpLink; |
| UTS | User Traffic Station; |
| VBR | Variable Bit Rate; and |
| VCI | Virtual Circuit Identifier. |

Referring now to FIG. 1, we have shown a diagram illustrating generally how the satellite data communication system of the present invention can be used to offer multi-media transport services to a variety of users. This service can be achieved with the use of a satellite 10 which makes use of a multi-beam antenna system and an on-board switching system operating with uplink and downlink protocols 11 able to support bandwidth-on-demand to meet the requirements of various traffic sources. For example, a gateway terminal 12 of a private network 13 and a gateway terminal 14 of an ISDN service 15 are likely to generate a fairly steady stream of data compared to individual users of multi-media work stations 16 which will make use of a carrier shared between all users.

The satellite data communication system of the present invention is made to operate in a Ka band global/regional geo-stationary network as illustrated in FIG. 2. The satellite network will be used to support multi-media and advanced business services to a large number of users with small terminals. In an embodiment of the present invention, a satellite 20 provides low to medium rate capacity ranging from 16 kilobit/second to 2.048 megabit/second, in increments of 16 kbps service to residential users 21. A medium rate service at 2.048 megabit/second is provided to advanced private business network (APBN) users via APBN terminals 22. A service provider can be provided with a high rate access of 65.536 megabit/second via gateway terminal 23.

In a global network, the North American satellite 20 would be provided with inter-satellite links connected to a satellite 24 over Europe and another satellite 25 over Asia.

As illustrated in FIG. 3a, the primary uplink access is a Multi-Frequency (MF)-TDMA. A high capacity TDMA uplink, shown in FIG. 3b, can be used for a public network "feeder" link. This uplink would be served by a gateway such as shown at reference numeral 23 of FIG. 2. The downlink access is a hopping TDM transmission, as shown in FIG. 3c. The uplink capacity is partitioned into MF-TDMA frames, each a matrix of time slots consisting of a number of TDMA carriers for the frame duration. One or more such carriers are allocated to each of a plurality of beam groups spanning the coverage area. As will be further described below, a beam group is defined as a collection of spot beams which are arranged in a predetermined configuration. One such configuration is shown in FIG. 4a.

Referring again to FIGS. 3a, 3b and 3c, each user terminal can flexibly access the capacity in one of the frames according to a multi-access protocol which will be described further below. In general, more frames can be allocated if capacity requirements increase. In the preferred embodiment, the peak link information rates are 512 kbps and 2.048 megabit/second on the uplink and 65.536 megabit/second on the downlink. The 2.048 megabit/second uplinks are organized as a 32-carrier MF-TDMA uplink carrier group to match the downlink carrier rate, while the downlink carrier is TDM. A 512 kilobit/second uplink variant is provided by dividing some number of 2.048 megabit/second carriers into 4×512 kilobit/second carriers, each representing part of the MF-TDMA format as shown in FIG. 3a. In general, the frame format will consist of a mix of both.

In FIG. 3a, all links use a 24 millisecond frame period and a fixed time slot duration, the latter being different between different carrier rates to give a constant data content (1 cell) per carrier time slot. This cell contains a 48 byte datafield (see FIG. 6a) plus a 5 byte header used for routing and uplink access control. An assignment of one cell per frame corresponds to 16 kilobit/second information rate. Thus, in a given frame, there are 32 cells per 512 kilobit/second carrier, 128 cells per 2.048 megabit/second carrier and 4,096 cells per 65.536 megabit/second carrier.

As indicated earlier, the satellite data communication of the present invention makes use of a multi-beam antenna system which enables the cost of terminals, which are driven by antenna size and transmitter power, to be reduced. An antenna size of about 70 cm. diameter for use at a user terminal with transmit powers of 1–2 watts can be achieved over a Ka band link of 30 GHz up/20 GHz down. Meeting these requirements requires very small spot beams, corresponding to about 128 spots across Canada and the United States. With such small spots, the spot user population will be highly variable, some spots being almost empty (example, far north of Canada) while others will be concentrated (for example around big cities). This is illustrated in FIG. 4a. Furthermore, the number of spots is much too high to allow one 65.536 megabit/second downlink carrier per spot for all spots.

Figures 4B, 4C:
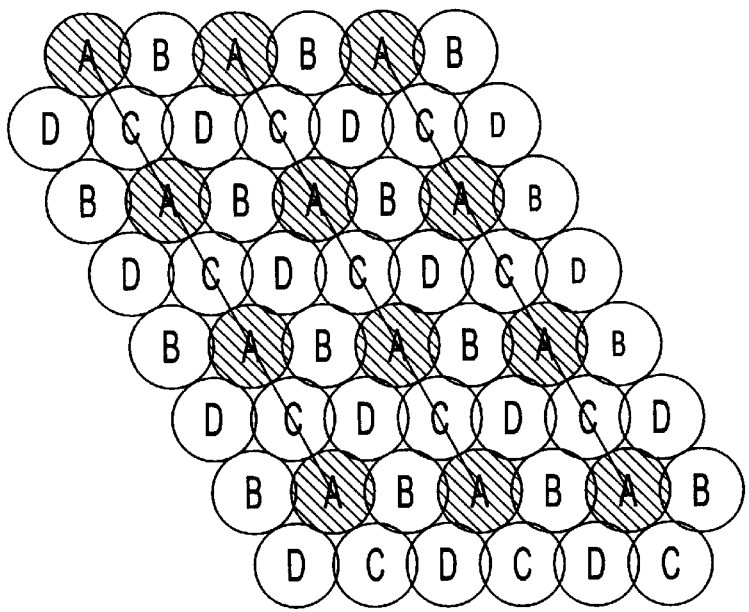
FIG. 4b illustrates the spot beam layout for the beam grouping geometry.
FIG. 4c illustrates a typical frequency and polarization re-use of the spot beam layout of FIG. 4b.

Accordingly, in order to maximize efficient bandwidth use for regions of expected lower traffic density, each 65.536 megabit/second downlink carrier is shared between a group of 4 spots chosen to give a good mix of dense and sparse spots to provide a similar overall demand per spot group. For regions of high traffic density, several spot beams may be allocated. This is illustrated in FIG. 4b. Each spot group supports both a residential carrier group and a feeder link carrier. The 65.536 megabit/second total capacity is distributed between the spots in a group as follows: The 32 carriers of the 2.048 megabit/second MF-TDMA uplink are distributed between the 4 spots of the group, as a whole number of carriers per spot, using a reprogrammable static switch. Each spot is formatted as an MF-TDMA subformat.

The division of 2.048 megabit/second carriers into 512 kilobit/second carriers is done thereafter. The result is that any given spot can have two MF-TDMA subformats, one at 2.048 megabit/second and the second at 512 kilobit/second. Each 65.536 megabit/second feeder uplink is time-shared between 4 spots using a reprogrammable Burst-Time Plan (BTP), with the cells associated with a given spot being grouped into a contiguous burst.

The objective of beam grouping is to provide flexibility in the allocation of satellite resources among a number of spot beams forming the beam group, to match both temporal and spatial (geographical) variations in user traffic density. The beam group consists of spot beams covering regions where a significant variation of traffic activity from beam to beam is anticipated, either at the start of the service or during the life of the mission. This will reduce potential under-utilization of dedicated satellite resources for spot beams with little or no traffic at all as compared to a strictly fixed beam architecture. For regions where a constant level of traffic activity representing a significant portion of the dedicated satellite capacity is expected, fixed beams are more suitable. In general the overall multibeam coverage can consist of a mix of fixed beams and beam groups of varying size and geometry to match anticipated large scale traffic distribution over the coverage area.

The geometric configuration of the beam group is determined primarily by the intrasystem interference associated with frequency re-use between beams. Intrasystem interference consists of both co-polarized and cross-polarized contributions from each of the number of simultaneously interfering beams that may occur. The beams are grouped in such a way as to minimize this number of beams. For a four beam group and a four frequency re-use plan, a beam group configuration as shown in FIG. 4b is selected to limit to two the maximum number of simultaneous and co-polarized co-channel beams which are adjacent and one beamwidth away. In general the distribution of active beams will be varying according to the real time traffic distribution so that only a limited number of beams may, at any time, experience the maximum intrasystem interference. As the size of the beam group increases, the degree of flexibility is improved and the intrasystem interference is decreased.

The beam groups are interleaved to achieve a beam to beam frequency re-use plan such as shown in FIG. 4c. This in turn permits the capacity in each of the interleaved groups to be directed to a localized area in which there is high traffic. This localization of capacity can be effected by both long term and short term traffic activity variations.

The total bandwidth allocated to a beam group is distributed amongst the spot beams which are a member of that group according to the traffic present in those beams. For the uplink, the bandwidth consists of a multi-frequency MF-TDMA group of carriers. The bandwidth is distributed in an integral number of carriers with a minimum capacity of one carrier in each beam. For the downlink, the group bandwidth consists of a single TDM carrier which is dynamically switched or hopped to the selected spot beam of the traffic destination. Each beam group supports two independently switched bandwidth allocations, separated by both polarization and frequency. The two RF signals are multiplexed into the same beam by septum polarization couplers. The septum polarizer is a device which generates a circularly polarized RF signal from left and right hand components on the transmit side and recovers these signal components from a circularly polarized signal on the receive side. A description of septum polarizer is provided in "Microwave Transmission Circuits", edited by George L. Regan, General Electric Research Laboratory, McGraw-Hill Book Company, Inc., 1948.

Figure 5A:
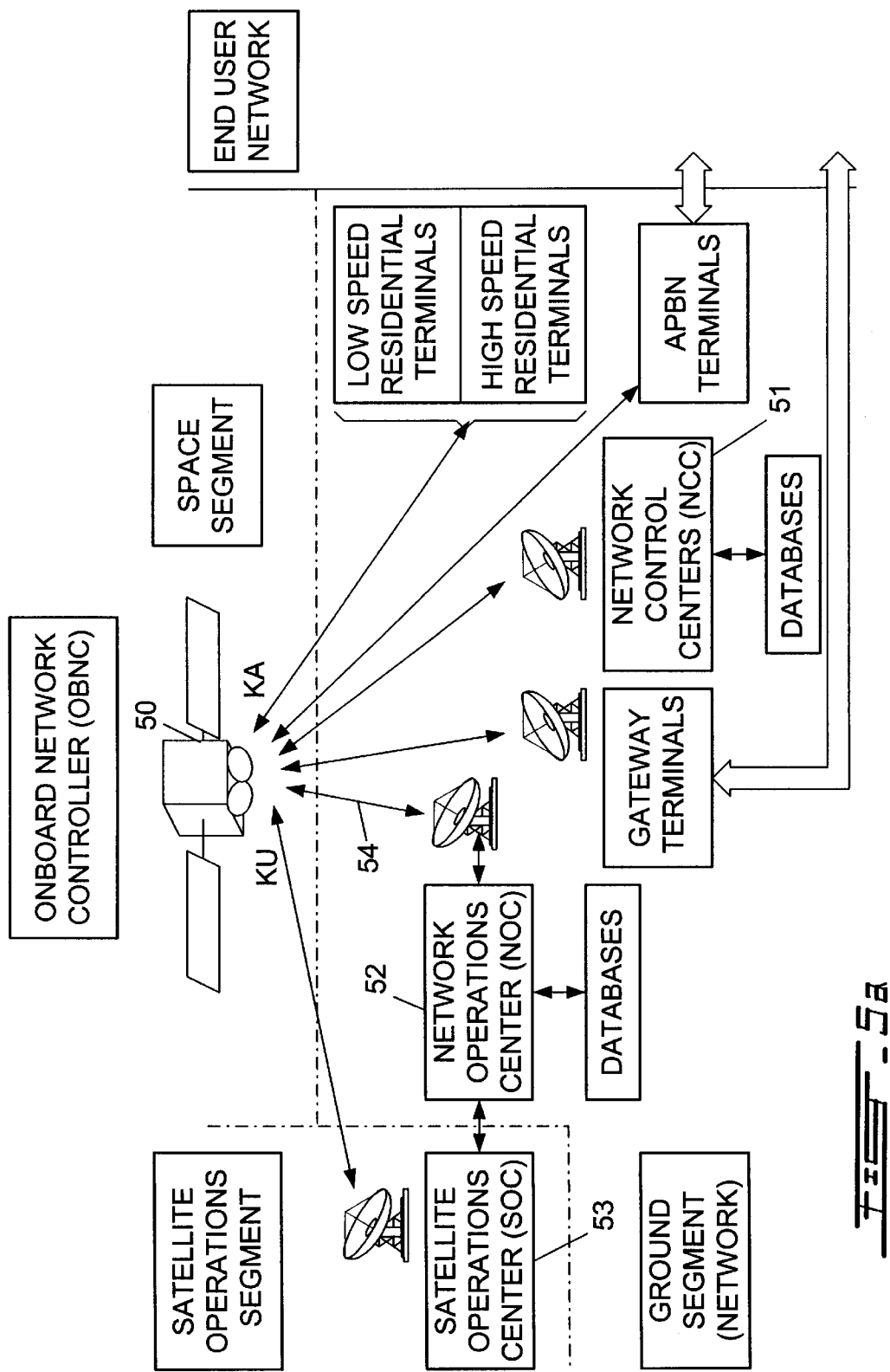
FIG. 5a is a block diagram showing the architecture of the system of the present invention.

Referring now to FIG. 5a, we have shown a block diagram illustrating the overall architecture of the satellite data communication system of the present invention. Network management for the satellite On-board Network Controller (OBNC) 50 and earth stations is performed in a hierarchical fashion. A Network Control Centre (NCC) 51 is provided for each user group used to provide network management functions for that user group. The NCC 51 is subject to the overall control of a Network Operations Centre (NOC) 52. The NOC 52 controls the partitioning of the overall capacity across user groups/rates and spots, and also handles any direct commanding of the payload on-board satellites. NCC 51 manages its own user group capacity, including call set-ups, terminal control and call detail/billing.

Payload control is split between the NOC 52 and Satellite Operations Centre (SOC) 53. The SOC 53 looks after those functions which are critical to the satellite, such as power and thermal management, and also handles payload functions which must be done in order to acquire the NOC link depicted by arrow 54 (for example, antenna deployment, payload initialization, etc.). These three functions, (SOC, NOC and NCC) although performed by ground facilities, also require some computing capability on-board for time critical functions. This on-board function is carried out by the On-Board Network Controller (OBNC) 50. For each of the functions, there is both a physical entity (the ground facility) and a logical entity (the combined software functionality of the OBNC and the ground facility).

The software interactions between ground and space segments are shown diagrammatically in FIG. 5b, with the width of the shaded bars representing the relative coupling (bars shaded \\\ represent payload management functions, those shaded /// are network management functions). The widest (i.e. most tightly coupled) bars are between payload DDSU 58 and terminal 57, representing the uplink access protocol. This is an important link as far as system performance is concerned and will be described further below.

The control of payload and system follows a philosophy which is based on intelligent on-board payload control via the OBNC computer (i.e. the OBNC controls/monitors most payload unit functions). This philosophy satisfies three main goals:

minimize payload unit redesign for different space craft types, by minimizing space craft dependent interfaces;

compensate for the limited command and telemetry bandwidth on most communication space crafts; and keep most payload control with the NOC, where it can tightly be integrated with network management operations.

The sequence of events in controlling the payload and network will now be further described with reference to FIG. 5b.

First in the control of the payload in the network is the initialization of the payload 55 under control of the SOC 53. The SOC 53 turns on the OBNC 50 and up-loads initial software. Then, the initial payload configuration is sent via SOC mode commands to the OBNC 50. The software of the OBNC 50 then acquires a control signal from NOC 52 in order to enable NOC 52 to take control over the OBNC 50. The network 56 can then be initialized under control of NOC 52. A full software up-load and payload configuration can then be completed via OBNC 50. The OBNC 50 can then acquire a signal from NCC 51 to enable network operations. Normal operations are then under control of NOC 52. These operations include network operations commanding and housekeeping telemetry, fault monitoring/isolation/recovery, satellite health monitoring which is sent to SOC 53, NOC to SOC communication to coordinate power management. Finally, the acquisition of a signal from terminal 57 can be accomplished via the DDSU 58. All NCC 51 will then look after their own user group networks for ongoing communications.

As will be explained in detail further below in the description of a typical call scenario, terminal acquisition is an ongoing process for most terminals. A typical residential terminal will post a log-on request via a dedicated signalling channel such as pre-assigned slotted Aloha time slots in the MF-TDMA frame to either their home NCC or to the NOC. Provided the system is not already full, they will then be allocated a terminal ID number and a channel for uplink synchronization. A class of permanent terminals are likely to be used which will be preknown to the NCC and which may be acquired explicitly by a polling method.

Once the satellite and its on-board switching system are on-line, the satellite data communication system can receive and forward requests from a source terminal to a destination terminal. In this regard, the switching of packet data through the on-board switching system involves two separate processes, namely routing and scheduling. The process of routing data has to do with how traffic is routed through the switch to its destination, while the scheduler process controls how individual terminals gain access to the RF links in order to send traffic.

Traffic routing through the on-board switching system of the present invention is done by a technique called Destination Directed Routing. As shown in FIG. 6a, all classes of traffic are divided into a standard sized cell for transmission. Each cell contains 48 bytes of user data plus a 5 byte header which is used for routing and other functions described below.

FIG. 6b shows diagrammatically how a cell is routed from a source terminal 60 to a destination terminal 61 via the on-board switching system of satellite 62. Traffic routing involves two fields in the cell header, namely the DownLink address (D/L) field which is comprised of 12 bits and the Virtual Circuit Identifier (VCI) field which is comprised of 20 bits. The number of bits used in each field can vary according to the specific implementation used. Thus, an uplink cell 63 will be comprised of the RQST, Type and Rain fields along with the D/L field 64, a VCI field 65 and a data field 66. The D/L field 64 is used by the on-board switch of satellite 62 to route the cell using a routing control circuit 67 to the appropriate downlink carrier. The D/L field is stripped off before transmission such that it will not appear in the downlink cell 68. The downlink address 64 can fall into one of three categories, namely a single cast address which is directed to a specific downlink spot, a multi-cast address directed to more than one downlink spot, and a broadcast address, which is directed to all downlink spots, and is a special multi-cast address.

The VCI field 65 is used by the receiving terminal 61 to identify which cell or cells it should receive and to provide information about onward routing. As with the D/L field, there are the same three classes of VCI, namely a single cast VCI directed to a specific terminal, a multi-cast VCI directed to more than one terminal and a broadcast VCI which is directed to all terminals.

Although the D/L and VCI classes are labelled similarly, there are some significant differences in how they are used. For example, one difference is that a single cast D/L can be a multi-cast VCI, for example, routed to all terminals in a given spot. Another difference is that all single cast VCIs, and many multi-cast VCIs are local in scope, i.e. their interpretation is downlink spot specific, allowing VCI re-use across different spots. There is consequently a division between multi-cast VCIs which are local (applied to one spot—full re-use), regional (applied to some subset of spots—limited re-use) or global (applied across all spots—no re-use), with the regional variety likely to be the most prolific. In similar fashion, there can be local, regional and global broadcast VCIs (that is, which go to all terminals within appropriate scope). It should be noted that the D/L address is interpreted by the OBSS hardware to identify a specific circuit associated with a downlink carrier, whereas a VCI is downloaded at the destination terminal in a look-up table to enable the destination terminal to receive data sent from the source terminal.

Another field in the uplink cell format, is the type field 69 which is also used for routing control under some circumstances. This field defines the cell priority, and is primarily used for downlink scheduling. However, there are several special types requiring action of the routing control 67. The first is a null cell type indicating a cell with no data. This cell type is discarded after extracting the request (RQST) field for the uplink scheduling process. Another is an error cell type indicating a cell which was rejected by Forward Error Correction (FEC) logic in the demodulator. This cell type is also discarded. Yet another cell type is the Out of Band Request (OBR) cell type indicating a cell which contains only RQST data for the uplink scheduler, and is routed directly to that function.

As indicated earlier, the scheduling process controls how individual terminals gain access to the RF links available in order to send traffic. Also, as indicated earlier, in order to support multi-media traffic efficiently, the satellite data communication system of the present invention will be required to handle traffic with varying jitter tolerance, cell loss tolerance, circuit set-up (access) latency and source burstiness. Thus, in order to handle these diverse requirements over a geo-stationary satellite, with its inherent long round-trip propagation delay of about a quarter of a second, requires a very efficient uplink access protocol and responsive capacity assignment algorithm.

The uplink assignment method used is optimized to provide circuit switch emulation for delay-sensitive Real Time Traffic (RT). RT traffic cannot tolerate cell loss or jitter, but have low burstiness and can tolerate relatively long call set-up delays (examples are standard telephones, stream data and Constant Bit Rate (CBR) video). These require emulating a conventional fixed circuit assignment.

The uplink assignment method should also provide sufficient capacity assignment to packet switch jitter-tolerant traffic. Jitter-tolerant traffic is at the other end or extreme of packet data, in that it has a very high burstiness (typically 400:1 ratios of burst to average rate) and requires a short access latency, but can tolerate transmission jitter and cell loss using ARQ recovery protocols. Carrying this class of traffic efficiently requires bandwidth-on-demand protocols with a short response time to individual burst (less than 1 second). Thus, with these types of traffic, the uplink assignment can be achieved using a combination of a responsive uplink access protocol and a dynamic on-board scheduler function. The system also supports a class of traffic known as Near Real Time (NRT), representing compressed/statistically multiplexed voice and Variable Bit Rate (VBR) video which requires a guaranteed no-loss connection and which has a moderate burstiness, can tolerate a relatively long circuit set-up time but which requires very short response (less than a few milliseconds) to transient bursts. Because this class covers compressed data, with a significant decompression processing delay, it should be able to tolerate minor jitter in transmission. It is therefore for the purpose of uplink assignment, treated as RT traffic.

The uplink access protocol used belongs to a class of uplink protocols known as Combined Free and Demand Assigned Multiple Access (CFDAMA). The particular protocol used is known as Explicit Volume Requests with Uncommitted Capacity Assignment/PIggy-Backed Requests for Initial Entry (EVRUCA/PIBRIE). In this protocol, terminals compete for three types of uplink capacity, Real Time; Jitter Tolerant and Free Capacity Assignment (FCA):

Capacity for Real Time traffic is reserved at the call level using call set-up and release procedures controlled by the ground based Network Control Centre (NCC). The terminal specifies the required capacity in terms of cells/frame. Once a call has been accepted, the capacity for that call is assigned to that terminal each frame until the call is released. Messaging associated with the call set-up and release protocols is carried over standard traffic cells assigned according to the uplink access protocol, as discussed under assigned cell usage below.

Capacity for Jitter Tolerant traffic is explicitly requested by the terminal using an Absolute Volume Request (AVR), based on the current total number of non-requested JT calls queued in the terminal (i.e. the total number queued less the total number of cells covered by earlier AVR requests still pending). Each AVR indicates the number of cell transmission opportunities (MF-TDMA slots) requested. These AVRs are queued on board as a cumulative count per terminal, the queue count being reduced each frame by the number of JT assignments to that terminal. For the $i^{th}$ terminal we have:

$$Q_i = Q_i + R_i \quad (1.1)$$

for each received AVR, $R_i$, where $Q_i$ is the queued count, and:

$$Q_i = Q_i - A_{JT_i} \quad (1.2)$$

for each JT assignment $A_{JT_i}$. It should be noted that the above expressions are algorithmic expressions, not equations. The "=" sign represents assignment rather than equality (i.e. the first expression should read $Q_i$ is assigned the [current] value of $Q_i$ plus $R_i$), and is a form commonly encountered in programming languages. AVR requests are transmitted by the terminal in either of two ways:

The primary request opportunity is an AVR field in the header of each traffic cell of any type. This is referred to as the In Band Request (IBR) mechanism. Because each cell can request $R_i$ other cell opportunities, and the $R_i$ are cumulative, the total requested capacity can grow exponentially, so that relatively small limits on each $R_i$ can give a rapid response to high transient loads.

A secondary request opportunity is provided by an AVR data field piggy-backed on to each uplink synchronization probe. This provides an initial entry mechanism for those terminals currently without assigned capacity. This is referred to as the Out of Band Request (OBR) mechanism.

JT assignments are made based on the $Q_i$, using a round-robin variation in queue scan order to ensure distribution fairness.

Any uplink capacity remaining unassigned after RT and JT assignments, is distributed freely in a round robin order for fairness. All terminals qualify for this Free Capacity Assignment (FCA), unless they have an "FCA inhibit" attribute set on-board. This FCA mechanism allows for early transmission of queued cells which may have arrived in the propagation delay time of the last AVR received by the satellite.

The total capacity assigned per terminal is signalled by the satellite on the downlink, with no discrimination between RT, JT and FCA components. The terminal is free to transmit any type of traffic in any cell (RT, JT, call management signalling, network management signalling, etc.) subject to the following constraints (imposed within the terminal):

RT traffic is limited to authorized calls, and to the requested rate for each such call; and JT traffic to a specific downlink may be limited by the congestion control mechanism described later.

Figure 7A:
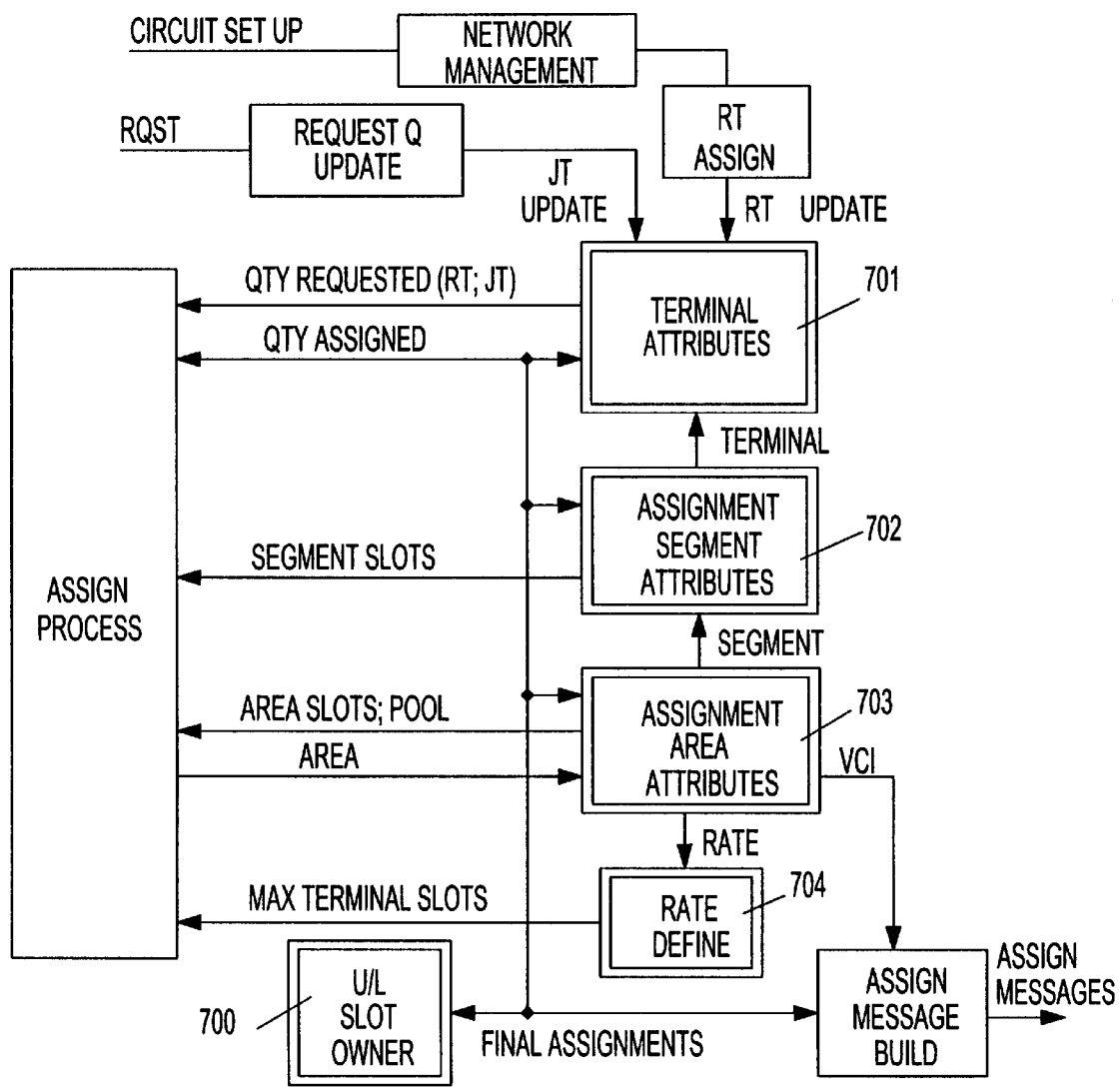
FIG. 7a is a data flow representation of the assignment process.

With reference to FIG. 7a, we have shown the slot assignment process data flow.

In parallel with signalling assignments to the terminal, the scheduler records these same assignments in a slot ownership table 700 which is sized to record the ownership of each frame in a full round trip delay. The ownership table for the current uplink data frame, which was generated one round trip delay earlier, is used to match each uplink cell with its source terminal ID. This identifies both the source of the RQST for the uplink scheduler, and the terminal user group identification, which is appended to the cell for the downlink scheduler processing.

An uplink scheduler algorithm processes the terminal capacity requests to provide an efficient way of assigning uplink bandwidth to the individual ground terminals according to demand.

The scheduler fully re-assigns the uplink capacity of the satellite each frame to track short term variations in JT traffic density while simplifying the processing to reduce the complexity and operating frequency of the on-board hardware to be compatible with low power CMOS technology. Key features of the scheduler are as follows:

The algorithm works in a virtual assignment space made up of Assignment Areas ("Areas") 703 and Assignment Segments ("Segments") 702. This provides flexibility in handling a wide range of uplink formats, carrier rates, geographical capacity distribution and the split capacity between User Groups.

Each Area describes the capacity of one geographical spot at one uplink carrier rate in terms of the number of assignable slots, together with the rate per individual carrier (uplink rate). The design complexity is further reduced by using a look-up rate table with a limited number of entries covering only those rates actually used. These rates can be modified by a ground command to provide design flexibility.

Each Area is further divided into one or more Segments, each of which defines one of the User Groups sharing that Area. The definition is the User Group purchased capacity in terms of the number of TDM slots. Any Area capacity not purchased by any User Group (i.e. Area capacity—sum of Segment capacities) is stored as Area Pool capacity.

Because each Area/Segment exists in virtual space, it has no direct reference to any outside world physical parameters, such as spot number, carrier number/frequency, etc., resulting in several gains:

The assignment space is kept as a simple rectangular area (number of carriers x no. of slots/carrier) irrespective of the actual carrier division, which may be on non-contiguous carriers in frequency space. This simplifies the scheduler algorithms.

It decouples the scheduler implementation from changes in payload configuration through the mission or across different missions. This allows scheduler hardware re-use between missions, simplifies operations planning and reduces constraints on payload and systems design.

The Area and Segment referencing can use arbitrary sequential indices rather than being tied to physical field parameters. This limits the parametric storage and processing scan cycle length to the number of combinations of physical parameters actually used, rather than the theoretical worst case value of the product of individual parameter worst case ranges. The resulting simplification has been estimated at 2–3 orders of magnitude in storage and processing load for example missions.

Downlink signalling of capacity assignment is Area relative, allowing significant reduction in the signalling bandwidth required.

The correlation between physical space and virtual space involves three interfaces:

a mapping function between physical uplink slots and the corresponding assignment space slots at the scheduler input to match AVR with terminal assigned to that slot (this uses a Random Access Memory (RAM) based look-up table);

specifying the Area downlink routing address for assignment signalling, compatible with the router part of the on-board switch; and a mapping function in each terminal between Area relative carrier coordinates and physical uplink carrier frequency, The added complexity of these interfaces is minor relative to the gains.

In FIG. 7a the data flow representation of the assignment process ties together processes (single outline boxes) and associated data tables (double outline boxes).

The assignment processing has a total of 5 tasks to perform:

Initialization—processes table update commands and initializes all assignment working parameters.

RT Assignment—assigns all RT traffic requests. Since these are set up in the switch by the network management system, they are assumed to be validated and assignments are done to the full amount.

JT Assignment—assigns all JT traffic requests in the Terminal Q fields, up to available capacity limits.

FCA Assignment—hands out any remaining capacity to all terminals with the Terminal FCA_Tag bit set. The FCA scan algorithm assigns only one slot per terminal.

Assignment Signalling—builds the downlink messages to signal the terminal assignments and forwards them to the Router function for routing/transmission.

From the flow in FIG. 7a, it can be seen that each assignment involves accessing in sequence the Terminal 701, Segment 702, Area 703 and Rate 704 tables. Doing this for each phase would involve excessive processing, so processing is minimized by the measures described below.

The scan is done hierarchically in the order Area, Segments per Area, Terminals per Segment. This allows Area and Segment level working parameters to be kept on chip during each scan (while the Area/Segment is being processed), to minimize table memory accesses.

A circular linked list structure is used to order the scan through Segments and Terminals, with list entry point maintained at the next higher level of the scan hierarchy (see FIG. 7b). This ensures that only those entries used are scanned, and that each entry is accessed only once per scan pass. It also simplifies removal and addition of terminals from/to segments, and of segments from/to areas (the random numbering of terminals/segments in the list order of FIG. 7b is intended to reflect the results of this process).

The processing ensures fairness in the assignment process by a systematic variation in list entry point vector from frame to frame.

This fairness sequencing is required to eliminate systematic biases required which would give individual entries more favourable access to capacity by virtue of their position in the scan sequence. For segments in a given area the goal is fair distribution of area pool capacity, while for terminals in a given segment it is fair distribution of segment JT capacity/FCA capacity. Because the individual areas are fully independent of one another, there is no fairness issue between areas, and hence no requirement to vary the area scan sequence.

The fairness method used for both segments and terminals is a round robin step sequence with the scan start point moved by a defined skip distance each frame so as to give medium term averaging. The skip distances are individually programmable per area/segment, with choice of skip distance set by two factors:

it should be proportional to the total population of the associated list so as to give a reasonable mean time for a given table entry to see a favourable position it should not be a factor of the list population, to avoid harmonic sample sequences.

An optimized scan sequence is used to combine tasks in each processing scan so as to complete these tasks into a short Pre-scan phase followed by two scan passes (Pre-assignment and Assign/Build). The Pre-scan phase performs the table update command processing part of the Initialization task.

In the Pre-assignment scan pass, the process calculates the total RT assignment commitment for each segment, and estimates the total RT+JT assignment, allowing for available Area pool capacity. These values are saved as Segment.ΣRT and Segment.ρA respectively, the latter being "clipped" at the maximum assignable to that segment. The final Area pool balance represents pool capacity which will be available for FCA, and is saved to Area.FCA_Pool.

In the Assign/Build scan pass, this process is essentially replicated in exactly the same order to do the actual assignment of RT+JT+FCA for each terminal. The Area pool balance (Area.FCA_Pool from the Pre-Assignment scan) is loaded into a Free_Pool working register, and the capacity available for FCA is calculated for each segment as the balance of segment owned capacity not pre-assigned to RT or JT capacity, allowing for remaining pool capacity (i.e. Segment.Max−Segment.ΣRT−Segment.ΣJT+Free_Pool). Because new cells arrive continuously in parallel with this processing, individual terminals may have posted requests between the estimate for that terminal and the JT assignment phase. This means that JT Q's may have grown since the pre-scan pass, and JT assignments may exceed that estimated. This is covered by "debiting" ΣJT to reflect JT assignments and "stealing" from any remaining FCA balance when ΣJT reaches zero. No attempt is made to recover free capacity already assigned to earlier terminals in the Segment scan sequence. This approach ensures that the JT assignments are at least equal to the first scan estimate and will partly track the most recent requests.

As each terminal assignment is made, the slot ownership table and downlink assignment messages are updated. In the latter case, this includes formatting cells for transmission and dispatching completed cells to the Router.

The assignment algorithm is provided below.

---

Algorithm 1-1 Uplink Scheduler

```
for each AREA                    {Pre-scan phase
    Available = Rate × Carriers  {Initialize working registers
    Free = Pool
    for each Area SEGMENT
        calculate ΣRT and Σ(RT + JT) across all Segment terminals¹
        subtract Σ(RT + JT) from Available & Free
    next SEGMENT
next AREA
for each AREA                    {Assign phase
    for each Area SEGMENT
        ΣJT = Σ(RT + JT) − ΣRT
        ΣFCA = Purchased capacity − Σ(RT + JT)
        for each Segment TERMINAL
            assign RT from ΣRT
            assign JT from ΣJT
            assign FCA from ΣFCA & Free (in order)
            signal total assignment (RT + JT + FCA) in downlink message
        next TERMINAL
    next SEGMENT
next AREA
```

Notes¹: Σdenotes sum of individual terminal assignment estimates for segment.

Figure 7C:
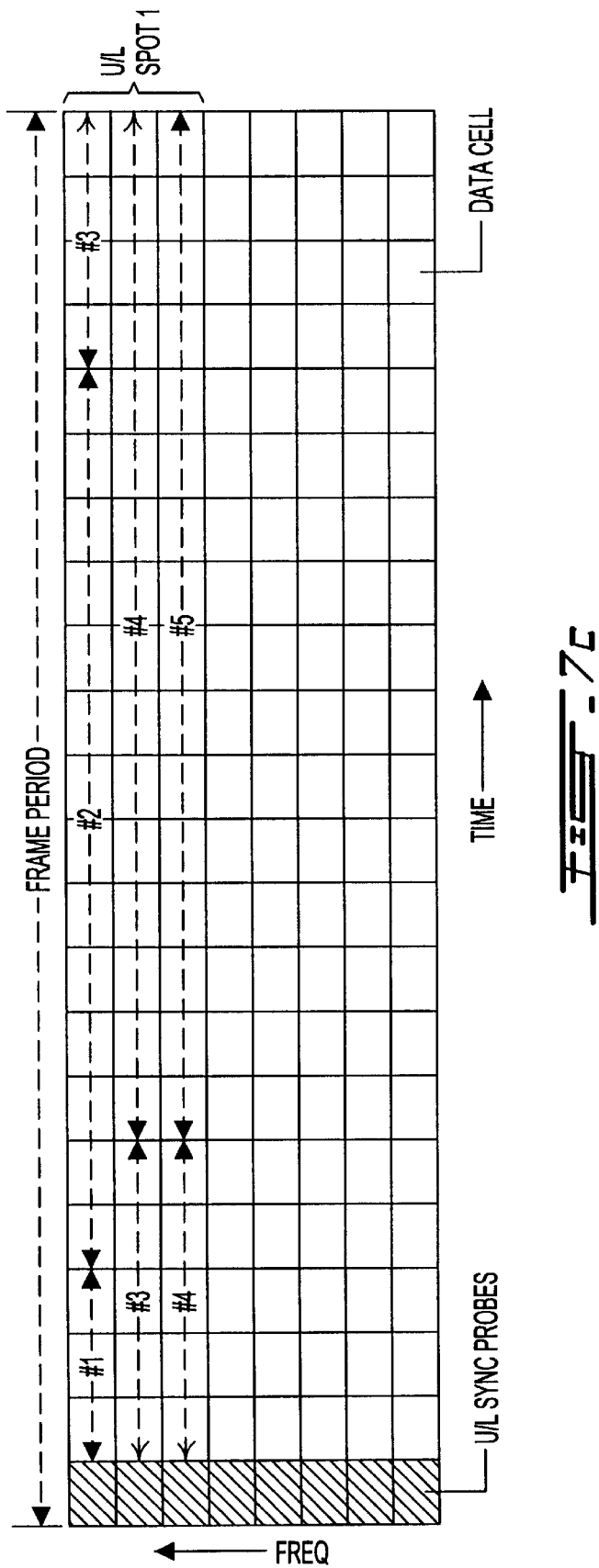
FIG. 7c is a table showing the scheduling of the uplink carrier capacity.

This algorithm calculates the total quantity of slots assigned to each terminal as the sum of each component (RT+JT+FCA). Physical slot allocation is then done by allocating the next sequential block of that size in left to right order on a carrier, wrapping round to the start of the next carrier (see FIG. 7c). The maximum assignment to any one terminal is set by the number of slots per carrier. This method has the following advantages:

it inherently guarantees that no terminal is assigned the same time slot on two different frequencies (required by MF-TDMA);

the terminal has at most one frequency transition per frame plus a second transition between frames; and the allocation law is deterministic, so downlink signalling need only specify the assigned quantities in sequential time order, and terminals can build the allocation from that at uplink build time (this technique, called Deferred Implied Allocation, provides for a bandwidth efficient assignment signalling protocol).

To provide User groups with a virtual Private Network (VPN) characteristic, the purchased capacity in the associated Segment is dedicated to terminals belonging to that User Group (Segment), and is only released to the Area Pool if it is not possible to fully assign it to those terminals. The Pool is distributed to all User Groups (Segments) on a first-come first-served basis for JT or FCA traffic, with provision for any User Group to disable its access to Pool. For RT traffic, each User Group can negotiate with the ground based NOC to sequester some or all of the Pool for the duration of a call.

The paragraphs below describe each of the tables of FIG. 7b. Each description defines the table [short form] name, the number of table entries, and the data structure of each individual entry. The data structure lists fields in an arbitrary order, and does not imply any particular ordering, or word organization, in table storage memory.

The field widths, in bits, and number of table entries, are shown for a typical case only. This corresponds to a port capable of supporting up to 128 areas; 128 segments; 32,767 active terminals and a total of 16,384 data cells per frame. For the typical system with 48 bytes per data per cell and a 24 ms frame time, each cell per frame represents a data rate of 16 kilobit/second, giving a port data capacity of 262.144 megabit/second.

---

Assignment Area Table

| Name: | Area |
|---|---|
| #Entries: | 128 |
| Data Structure: | As per Table I. |

TABLE I

Assignment Area Table

| Field | #Bits | Function |
|---|---|---|
| Active | 1 | '1' = Area active; '0' = Area not used |
| StartSeg | 7 | Pointer to first segment in area (entry # in SEGMENT table) |
| SegSkip | 3 | Start point skip distance |
| Rate | 2 | Carrier rate ID (entry # in RATE table) |
| Cells | 14 | Assignable capacity (cells) - see note 1 |
| Pool | 14 | Pool capacity (cells) - see note 2 |
| FCA_Pool | 14 | Pool capacity for FCA (working register) - see note 2 |
| ULType | 2 | Processing control - see Table 3-II and para. 3.2.6 |
| D/L | 12 | Downlink address for assignment messages |
| Total | 69 | |

Notes:
1) 0 assignable capacity is not meaningful for an active area
2) Maximum JT assignment limited to 16383 cells (pool only valid for JT).

TABLE II

Process Control Codes

| Code | Function | Notes |
|---|---|---|
| 00 | Assign active; floating segments | Standard processing |
| 01 | Assign active; static segments | Segment order & duration fixed - similar to JT Pool disabled for all, but with round robin segment scan disabled |
| 10 | No assign; connection map update | Map based on Term RT field with fixed terminal sequencing |
| 11 | No assign; no connection map update | No processing |

This table defines the parameters of each assignment area, and is accessed in a linear scan fashion from ID #0 to ID

127. The Area Active bit defines if the associated area is to be processed or not.

Rate Table

| | |
|---|---|
| Name: | Rate |
| #Entries: | 4 |
| Data Structure: | This table has only one field, Rate.Slots, giving the number of slots per carrier. Each slot represents a data rate of 16 kilobit/second, so we need 14 bits to specify up to 262 Megabit/second (0 is a meaningless value). |

Assignment Segment Table

| | |
|---|---|
| Name: | Segment |
| #Entries: | 128 |
| Data Structure: | As per Table III. |

TABLE III

Assignment Segment Table

| Field | #Bits | Function |
|---|---|---|
| Active | 1 | '1' = segment active; '0' = remove from area list at start of next frame |
| Next | 7 | Pointer to next segment in area (self if only 1 segment) |
| StartTermp | 15 | Pointer to first terminal in segment - see note 1 |
| TermSkip | 5 | Start point skip distance |
| Cells | 14 | Owned capacity (cells) - see note 2 |
| JT_Pool | 1 | '1' = segment can use pool; '0' = pool use disabled |
| ΣRT | 15 | Total Real Time traffic assignment (working register) |
| ΣA | 15 | Total traffic pre-assignment (working register) |
| Total | 73 | |

Notes:
1) Set to NULL terminal ID if no terminals logged on (see Terminal Attribute Table below)
2) 0 owned capacity is not meaningful for an active segment.

Terminal Attribute Table

| | |
|---|---|
| Name: | Terminal |
| #Entries: | One entry per terminal ID - 32,768 entries. By convention, one terminal ID (the NULL ID) is reserved as a dummy, giving a maximum of 32,767 active terminals. |
| Date Structure: | as Per Table IV. |

TABLE IV

Terminal Attribute Table

| Field | #Bits | Function |
|---|---|---|
| Active | 1 | '1' =terminal active; '0' = remove from segment list at start of next frame |
| Next | 15 | Pointer to next terminal in segment (self if only 1 terminal) |
| RT | 15 | Real Time Assignment |
| FCATag | 1 | '1' = Terminal can use FCA; '0' = FCA disabled |
| Q | 16 | Current queued JT capacity (note 1) |

TABLE IV-continued

Terminal Attribute Table

| Field | #Bits | Function |
|---|---|---|
| Total | 48 | |

Notes:
1) The round trip delay of about 12 frames (4 bits), combined with a 14 bit maximum JT capacity per frame gives a theoretical upper bound for Q of 18 bits. However, 1 or 2 bits can be cut from this limit, since an uplink supporting terminal of an average capacity in the 200 Megabit/second+ region would be limited to very few terminals, each of which would be getting a high average assignment. A 16 bit Q is adequate where each terminal gets an assignment of at least 25% of demand,
averaged over time periods of a few frames.

Table Update Control

Table updates are done via commands from the On Board Network Controller (OBNC).

The update of linked list entries is relatively infrequent in this system. Most frequent is the terminal list, which is updated to reflect terminals logging on or off, while segment list changes should be rare (e.g. adding a new user group or adding user group support to a given carrier rate). All changes are performed under ground control from the network management system. We can define a simple procedure for list maintenance:

To add a new list entry, we initialize the table entry off-line via network management system command, and then the entry is added synchronously to the start of frame (i.e. during the Initialize scan). Since scan order is unimportant, the insertion can be done anywhere that is convenient, with the obvious place being immediately after the current start pointer.

To delete a list entry, we can define an "active" tag bit in the entry. The network management system sets this bit to "inactive" by command. During the initialize scan, any entries tagged as inactive are removed by the logic by changing the Next pointer of the preceding entry.

A special value of NULL for the terminal start pointer is used to indicate that no terminals are active in a segment. This is subtly different to the segment being inactive—it just means that no terminals are logged on to that user group/rate/spot. The implication is that adding a terminal to such segment is a special case of making it the start terminal and making its Next pointer point back to itself. Similarly, if a terminal being deleted has its Next pointer addressing itself, then it is the only entry in the segment terminal list, and the deletion is achieved by setting the start pointer to NULL. The active value of NULL is all 1's, i.e. terminal 7FFFh (Terminal ID 32767) is a dummy.

This transition to/from an area with no segments is different, since any area without segments is automatically non-active. In this case, for a new area, the network management system explicitly sets up area/segment fields before setting the active bit in the Area entry. Deletion of the sole remaining segment in an area automatically sets that area inactive.

The downlink assignment signalling protocol (per Area) occupies a single packet, which is segmented into standard data cells for transmission. The packet is built up of a number of 2 or 3 byte sub-messages, each defining the next block of assignments by terminal number and block size. The sub-message format is as follows:

The most significant bit of the first byte is a Sub-Message Length Flag, "1" indicates a 2 byte sub-message and "O" a 3 byte sub-message.

If the assignment block is a single slot, the sub-message is 2 bytes long giving the 15 bit terminal number in the remaining bits.

For a multiple slot block, the sub-message is 3 bytes long. The remaining 7 bits of the first byte give the value (block length-1) and the $2^{nd}$ and $3^{rd}$ bytes give the terminal number. Since this corresponds to a maximum block length of 128, blocks longer than this are signalled as the appropriate number of maximum length block sub-messages followed by a single 2 or 3 byte sub-message giving the balance modulo 128.

One terminal ID (number) is reserved to signal a null assignment block (i.e. capacity which remains unassigned), giving a maximum number of active terminals per Area of 32,767.

The illegal $1^{st}$ byte value of 0 (implies a 3 byte sub-message of block length 1), is used as a packet termination byte. The full assignment is signalled each frame, with the sub-message ordering tracking the block allocation order given above.

The discussion above assumes an MF-TDMA uplink, but the switch is also able to support other uplink formats. These affect the way in which the Assignment Area is processed. Process control is defined by the process control codes shown in the Table V.

The standard processing code (00) corresponds to the uplink scheduling algorithms given above with code 01 being a variant of this where special situations require dynamic assignment by terminal, but fixed segment size and order.

TABLE V

Process Control

| Code | Function | Notes |
|---|---|---|
| 00 | Assign active; floating segments | Standard processing |
| 01 | Assign active; static segments | Segment order & duration fixed - equivalent to JTPool disabled for all, and round robin segment scan disabled |
| 10 | No assign; connection map update | Map based on Term.RT field with fixed terminal sequencing |
| 11 | No assign; no connection map update | No processing |

Processing codes 10 and 11 are used where there is no dynamic scheduling of capacity in the associated area (i.e. fixed capacity assignments). With code 10, the slot ownership table is built according to the RT circuit assignments set up by the network management system, using the fixed terminal sequencing set up by the linked list structure. No assignment messages are sent on the downlink. With code 11, the scheduler is inactive, and the network management system is responsible for loading the slot ownership table contents [with static data].

TDMA formats are supported for any of the process control codes above.

The simplest case of TDMA is where the uplink is sourced from only one geographical spot, and is directly equivalent to a special case of MF-TDMA with only one carrier, i.e. the whole carrier is one assignment area and can be divided into several segments as below.

More complex is the case where the TDMA uplink is shared across several geographical spots, by the use of beam hopping. This is supported by the switch by partitioning the carrier between areas according to a pseudo-static Burst Time Plan (BTP) as shown below.

| Area | 1 | 2 | 3 | 4 |
|---|---|---|---|---|
| #Cells | n1 | n2 | n3 | n4 |

Each spot is associated with a different area of capacity defined by the number of contiguous cells in the burst. As before, each area can be subdivided into a number of segments. Typically the Area rate parameter would be made identical for all areas, corresponding to a rate (slots/carrier) which is greater than any individual area capacity (e.g. could be the TDMA carrier capacity), so that standard (code 00 or 01) processing will limit the capacity assigned to a given terminal by the smaller of area or segment capacity.

Pure TDM is sourced from a single terminal, so inherently requires no assignment processing (i.e. processing control code 11).

The switch also supports a variant of pure TDM, TDM/TDMA, in which the uplink frame is divided into some number of TDM bursts, each burst being from a different source and separated by a window time from adjacent bursts (i.e. a format similar to that used for the downlink FIG. 3). In this case, individual terminal bursts can be members of segments and areas, in similar fashion to the beam hopped TDMA partitioning above, with scheduling controlled by any of the process control codes.

FDMA carrier types are owned by one terminal, so require no assignment processing. Depending on how network management is performed, the processing control code is either 10 (slot ownership set via dummy RT assignments equal to one carrier) or code 11 (slot ownership defined directly by network management. In this case, each segment corresponds to the set of FDMA carriers owned by one user group.

Standard CDMA is equivalent to FDMA, so is treated in the same way. Current research is considering a CDMA equivalent to MF-TDMA called Multi-Code TDMA (MC-TDMA). The impact of this on the switch assignment has yet to be investigated, but it seems likely that it could be treated as equivalent to MF-TDMA, with codes replacing carriers.

Figure 8A:
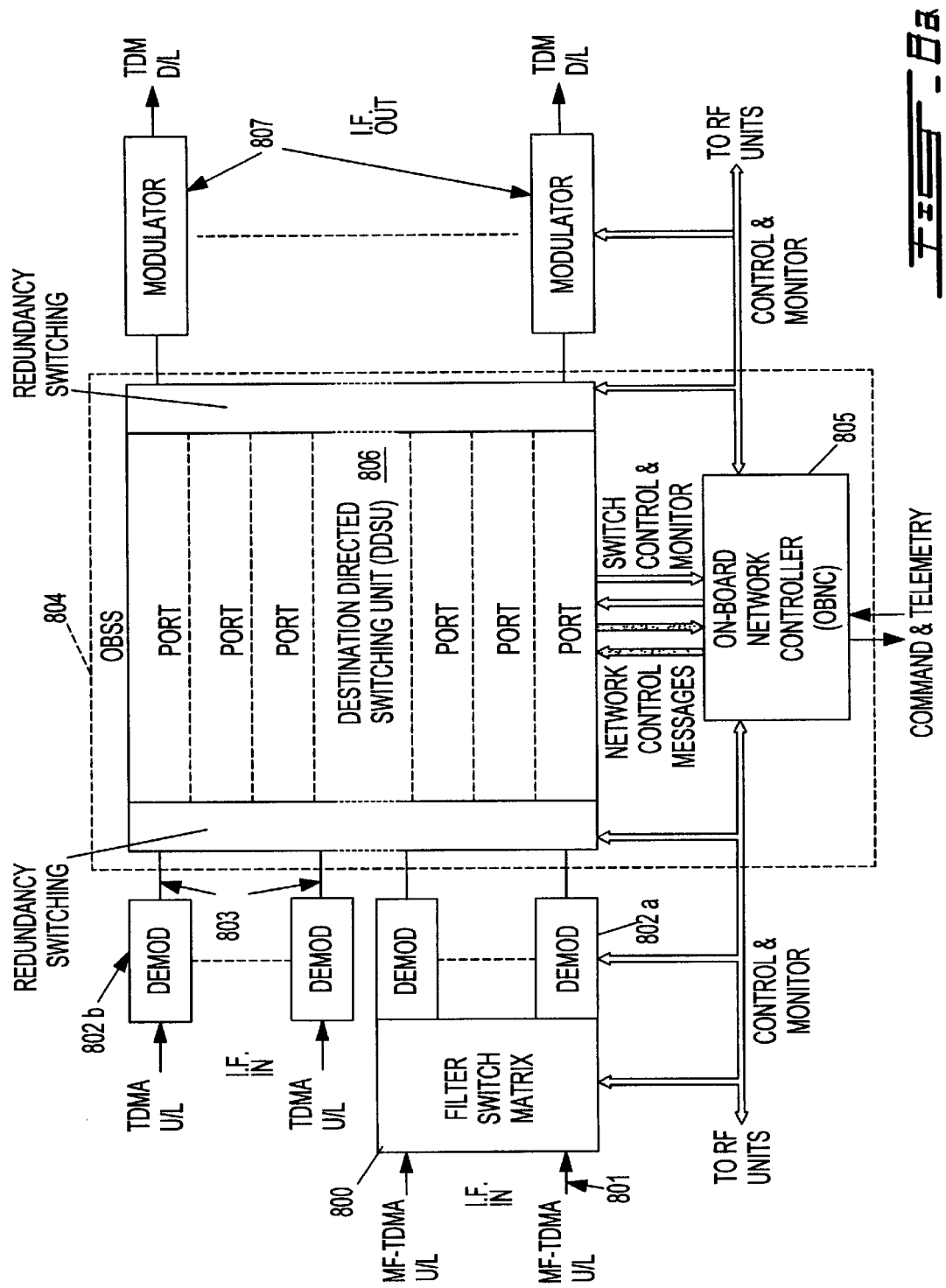
FIG. 8a is a block diagram of the On-Board Switch Subsystem (OBSS) for use with the data communication system of the present invention.

Referring now to FIG. 8a, we have shown a block diagram of the on-board switching system (OBSS) 804 of the satellite data communication of the present invention. The OBSS 804 utilizes Multi-Carrier Demultiplexing, Demodulation and Decoding (MCDDD) and a space adapted multi-gigabit/second fast packet switching fabric which, in addition to self-routing, dynamically controls the allocation of the uplink and downlink bandwidth to improve capacity utilization efficiency of the basic routing function. The OBSS thus permits single-hop interconnectivity required for mesh networking, and contributes to the required high-gain link margins through digital regeneration encoding gain. The OBSS also provides beam flexibility to ensure a degree of capacity redistribution to match geographic and temporal traffic loading variations over a group of four spot beams. This is accomplished by an IF switching matrix on the uplink and a beam hopping approach on the downlink. The OBSS 804 controls the switching of the service link TDM downlink carriers to the spot beam in which the destination terminal is located.

As shown in FIG. 8a, the IF switch matrix 800 interconnects the beam outputs of the uplink MF-TDMA data 801 to a bank of multi-carrier demultiplexers 802. The demultiplexers 802 are switched in units of capacity, normally nominally 16 megabits/second. For each group of M uplink spot beams, sufficient units of demultiplexing capacity are equipped such that any one of the spot beams could be allocated to maximum capacity while the rest can be allocated one unit of capacity. In this way, the capacity can be allocated to the spot beam with the most traffic at any given time.

The demultiplexers are capable of processing a number of rates in binary steps from 128 kilobits/second to 2.048 megabits/second and higher by adding successive stages of demultiplexing. The output from the demultiplexers consists of a time sequence of the individual carriers which is input into a demodulator in the coder circuit (not shown). That time sequence of TDMA data stream 803 is then input to a port of the OBSS 804.

The OBSS 804 consists of the OBNC 805+DDSU 806. The Destination Directed Switching Unit (DDSU) performs the dynamic routing and scheduling of traffic. The DDSU is a multi-gigabit/second fast-packet switch with a TST architecture, which interconnects the input and output processors for all transmission paths in the architecture including the service link, feeder link, inter-satellite links and the On-Board Network Controller OBNC 805. The OBNC 805 controls the scheduling function. The T (time or memory) stages are the ports which are interconnected by a multistage S stage. Each port handles a capacity of one-quarter gigabit and higher. The switch routes the traffic (cells) from the input port to the required downlink port according to the address in the routing header attached to the cell; this process is sometimes referred to as self-routing. The output from the downlink ports are then formatted and input to the modulators 807 which perform the downlink coding and QPSK modulation.

The on-board switching system comprises two units, the OBNC 805 and the DDSU 806. The filter switch matrix 800 and demodulators 802 provide 2.048 megabit/second and 512 kilobit/second MF-TDMA services. The demodulator 802b provides service for the 65.536 megabit/second TDMA feeder uplink. The downlink modulators 807 provide TDM service prior to the beam hopping which is done by hop switches later in the RF transmit chain. The DDSU 806 is the unit which performs the high-speed switching of the data, together with the high speed frame-by-frame scheduling functions.

The high-speed scheduling function includes the uplink scheduling (access protocol processing and bandwidth-on-demand capacity assignment/signalling); cell routing and buffering, including multi-cast/broadcast handling; downlink scheduling (downlink carrier hopping and traffic type prioritization); congestion control buffer matrix; and virtual private network capacity separation.

As indicated in relation to FIG. 5b, the OBNC 805 performs time critical payload and network management functions. As such it is a general-purpose computer with special interfaces to payload units for command and monitoring purposes. In this immediate context of the OBSS 804, it has a special role in being a command and monitor route between the ground facilities (SOC 53, NOC 52 and NCC 51) and the DDSU 58, and performs a number of DDSU control tasks which are less time critical than the DDSU processes but still too time critical for ground processing. Such tasks include gathering frame rate status information, such as congestion control metrics, and formatting them into cells for transmission on the downlink.

Figure 8B:
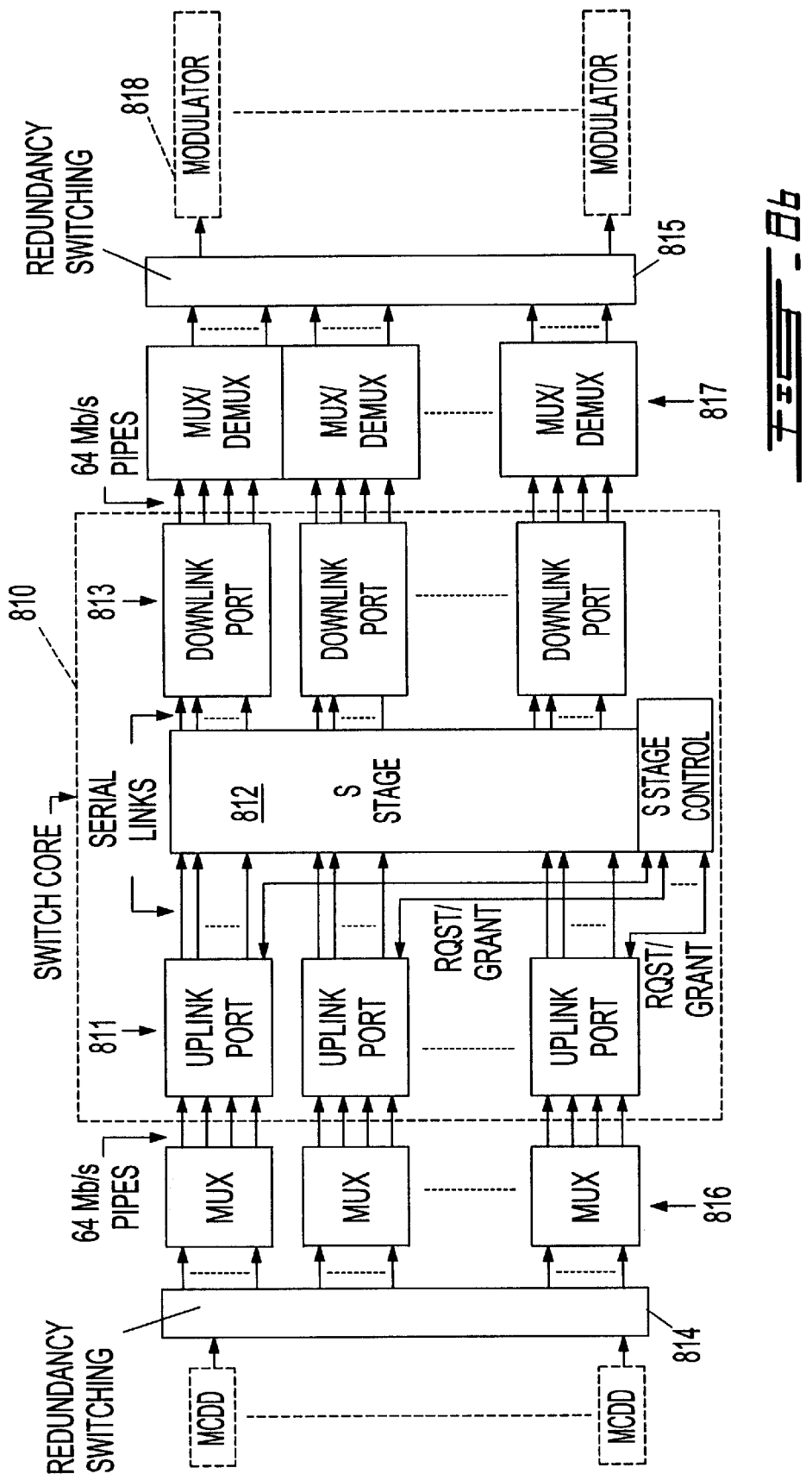

Referring now to FIG. 8b, we have shown a block diagram of the DDSU including associated elements of the on-board switching-system. The DDSU is modular in design and makes use of uplink ports 811, a space stage (S stage) 812 for providing the cross-connection between the uplink ports 811 and downlink ports 813. The switch core architecture 810 uses both input and output buffering (not shown) as part of the uplink and downlink ports. Provision is made for redundancy switching 814 at the input and 815 at the output interfaces respectively, to allow internal active redundancy at the port level for enhanced reliability. Multiplexer/demultiplexer functions 816 and 817 adapt the data rates of the external data interfaces to standard rate buses into and out of the switch core.

As indicated earlier, data through the switch is formatted as cells, each cell comprising a header portion and a data portion. The data portion is typically sized to contain 48 bytes of information, to match the data content of an ATM cell, although the switch principle is not constrained by this number and could handle other cell sizes. The header is, in turn, comprised of several fields, which may be different between uplink and downlink cells. From the uplink cell, three of these fields are used by the switch, and may either be passed through the switch unchanged, passed through with changes or removed by the switch, as required for downlink formatting. Those header fields not used by the switch are passed through unchanged, and will typically include end-to-end protocol information plus a Virtual Circuit Identifier (VCI) for onward routing at the receiving user traffic station.

Figure 9:
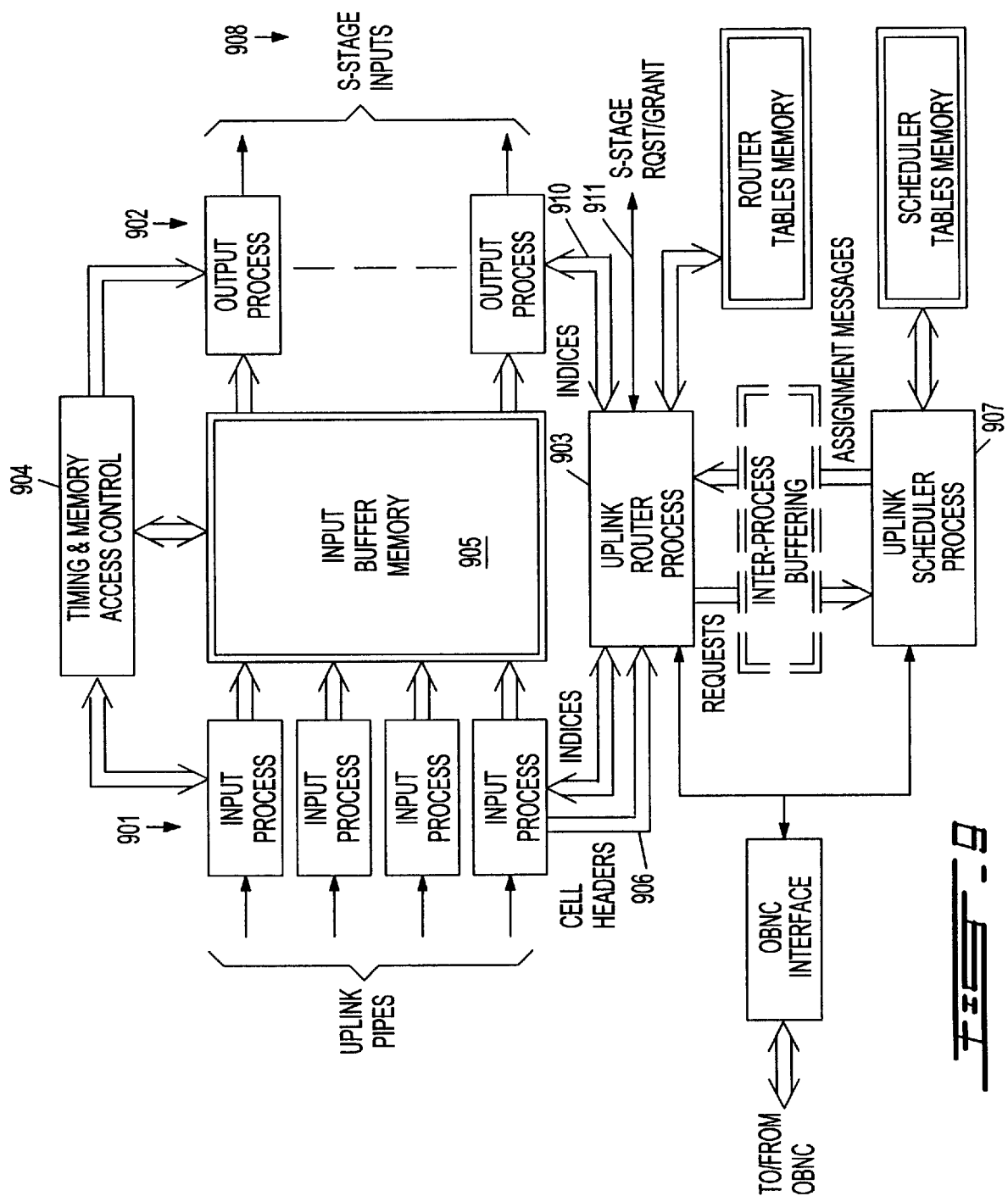
FIG. 9 is a block diagram of the uplink port used in the DDSU of FIG. 8b.

Referring now to FIG. 9, we have shown a block diagram of the uplink port portion of the on-board switching system. Functionally, the uplink port is split between scheduler and router functions. That is, a number of elements in the uplink port operation are shared for the scheduling and routing functions. As indicated earlier, the scheduling function implements the uplink access protocol and dynamic capacity assignment algorithms. Each port is capable of supporting up to 32,767 multi-media terminals. To give the required flexibility, these algorithms are capable of handling up to four different uplink rates per port, multiple uplink formats, such as MF-TDMA, TDMA, TDM, FDMA and CDMA in a programmable geographical split. The scheduling process is making assignments for a frame which will be routed when it arrives one round-trip delay in the future, and is therefore essentially decoupled from the router process in time. Communication between the two processes allows for this delay, and takes place via a connect map storage which stores information about terminal and user group ownership of each cell for each of the twelve or so frames of the delay. The routing function handles all traffic routing and buffering and comprises the input and output processes 901 and 902 respectively, the router process 903 and the timing and memory access control 904.

Figure 10:
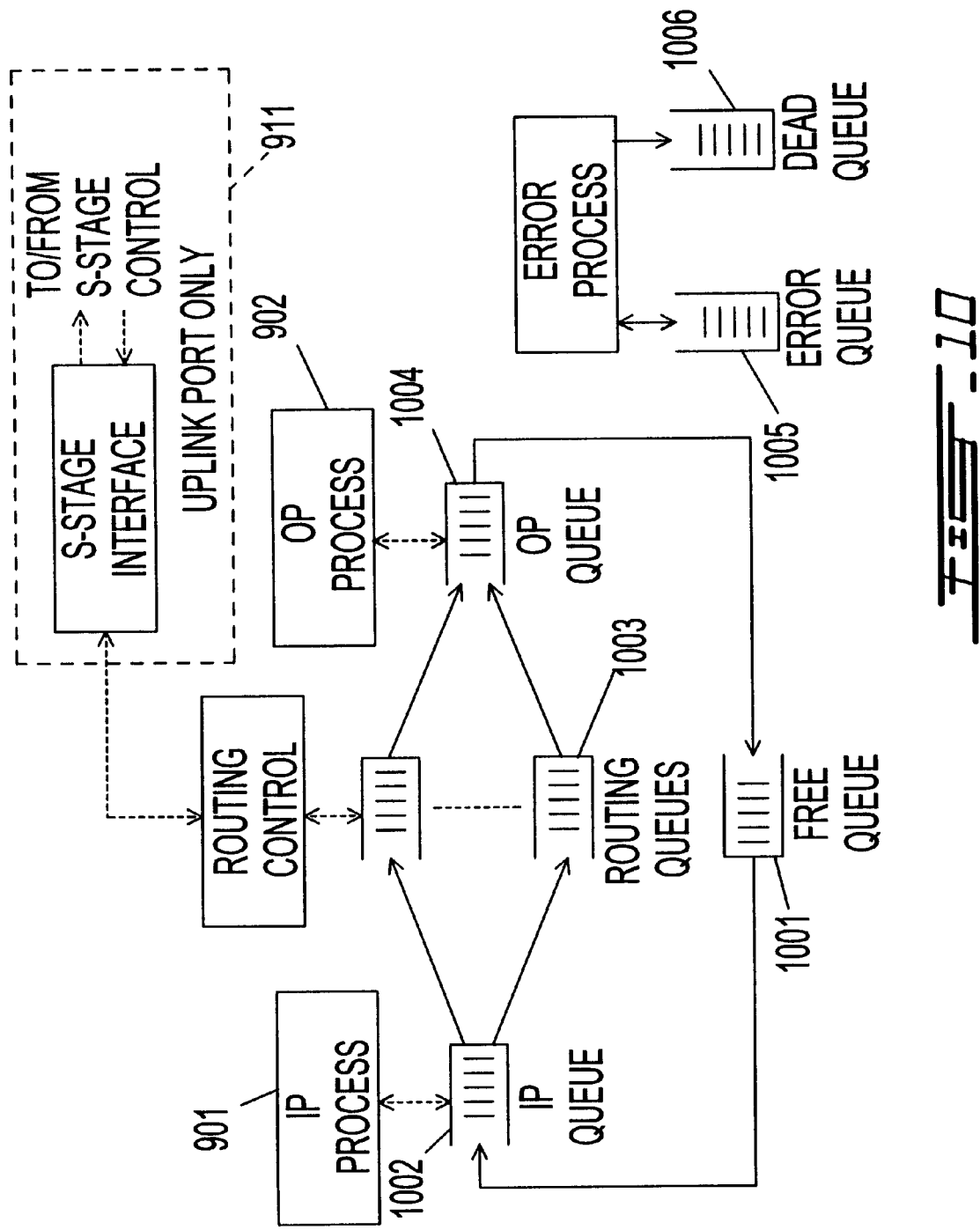
FIG. 10 is an illustration of the port queue flow process.

For a better understanding of the routing principle, reference is made to FIGS. 9 and 10. In FIG. 10, a flow diagram is illustrated for showing index queue transfers on which the routing function is based. The input buffer memory 905 is partitioned into cell-sized segments, and each segment is allocated an index number. Initially, all indices are stored in a free queue 1001. As soon as the on-board switch is initiated, one index is stored in each of the input processes 901 via an input queue 1002. As each input process 901 receives a cell, it stores the cell in a segment of the input buffer memory 905 which is tied to its index. As each input process 901 receives a cell and transfers it to the input buffer memory segment to which its index is tied, the cell header is extracted 906 and returned to the router process 903. This step results in four separate but parallel actions.

The first is that it mates the header to the index. The index is then passed on to the tail of an appropriate routing queue 1003. In principal this could be one single queue, but provision is made for multiple queues to allow some separation based on cell priority or single cast versus multi-cast address types. From a connect map of the scheduler process 907, associated with the current uplink frame, the user group owning the cell is extracted and attached to the index. The AVR request part of the header is then passed to the scheduler process 907 to be associated with the terminal owning the cell as defined in the connect map. The input process 901 is also provided with a new index from the free queue 1001, ready for the next cell.

On the S stage side of the port 908, indices are pulled off 910 the routing queues 1003. The indices are then loaded into the output processes 902 via an output queue 1004 and requests are posted to the S stage 802 based on the downlink address part of the attached header. Following the S stage grant 911, those indices which succeed in gaining a path through the S stage use the index to retrieve and transmit the cell from the input buffer memory 905, and then return the index to the free queue 1001 for recycling. The user group information is then added to the cell header. Cells which do not get S stage capacity stay in the output queue 1004, while the successful indices are replaced with fresh indices from the routing queues 1003.

Two write-only queues 1005 and 1006 are used to hold indices which are either bad or which correspond to bad segments in the input buffer memory 905. The level of badness is determined by parity checks. Initially, such indices are taken out of circulation temporarily, by pushing them into the error queue 1005. The OBNC 705 performs checks on such indices to determine if the fault was soft, i.e. caused by a transient upset, or hard which is caused by a physical device failure. Soft failures are retrieved from the error queue 1005 and placed back on the free queue 1001 for re-use. Hard failures are discarded into the dead queue 1006 and are lost forever. Because cells are routed through the S stage quickly, the input buffer memory size can be relatively modest, being one row of memories (128K words at 1 megabit RAM×32 or 40 bits).

Figure 11:
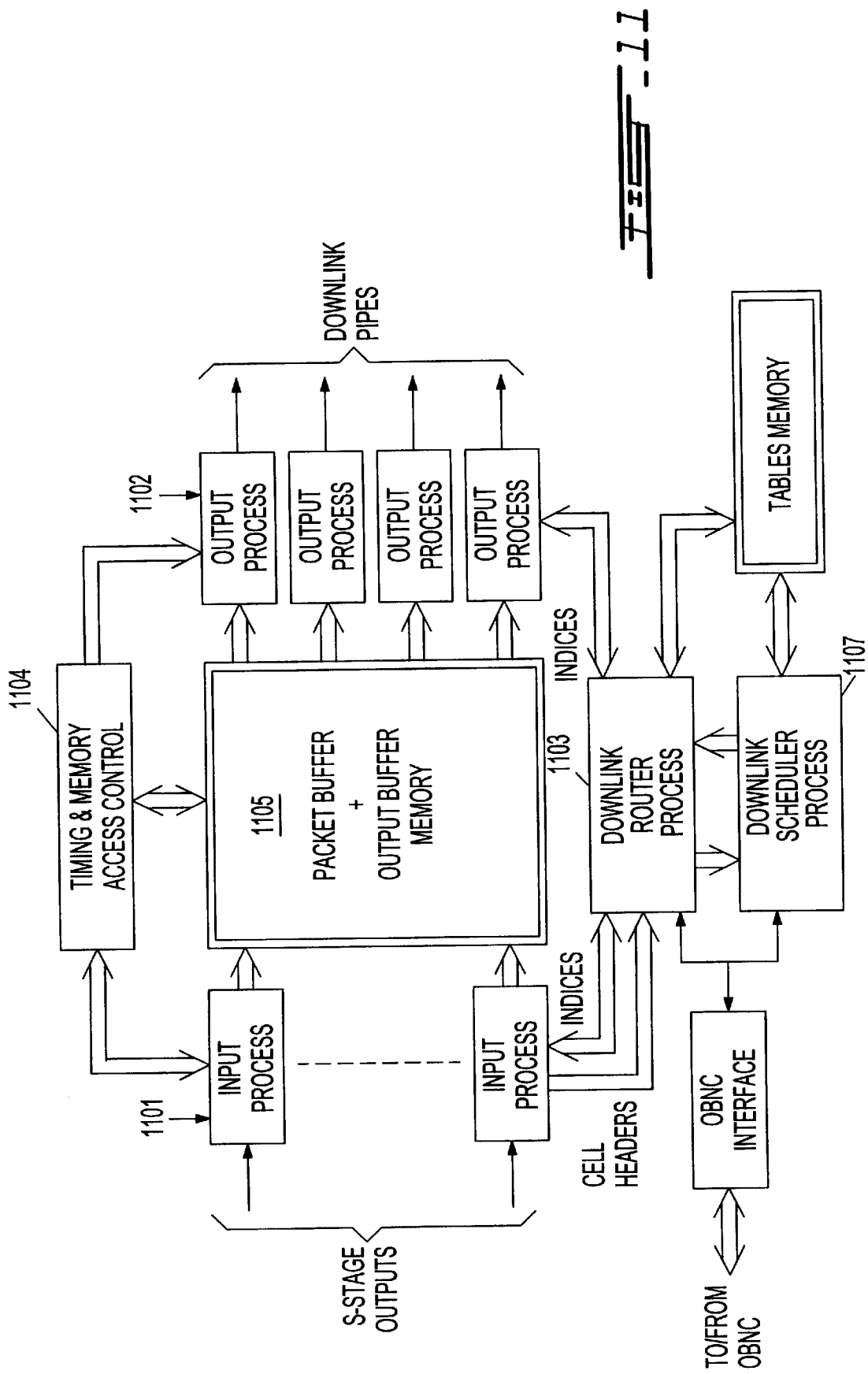
FIG. 11 is a block diagram of the downlink port.

Referring now to FIG. 11, we have shown a block diagram of the downlink port. As with the uplink port, a logical sharing exists between the routing and scheduling functions. However, at the downlink port, both processes act on the same data at the same time and are therefore tightly coupled. Therefore, although described separately for convenience, these two functions are implemented in a single combined process.

As with the uplink port, the downlink port is provided with input processes 1101, output processes 1102 both of which are controlled by a timing and memory access control circuit 1104. The downlink port is provided with a packet and output memory buffer 1105, downlink router process circuit 1103 and downlink scheduler process circuit 1107.

The downlink scheduler process circuit 1107 builds the downlink data in prioritized order within the constraints of user group independence. The routing process 1103 is similar to the uplink router process, using the same queue flow principle. However, there are some differences, namely, the output buffer memory 1105 is much bigger than the input buffer memory 905. This enables the support of JT cell congestion control buffering. This means that there are many more indices, so queue sizes and index-related bit fields are larger to match. As a base line, the buffer memory is set at 8 megabytes. There are multiple routing queues to handle multiple carriers, priorities and user groups. The input and output processes are mirrored relative to the uplink port, i.e. the IP processes are undifferentiated but the OP processes are tied to their respective 65.536 megabit/second buses. The IP processes 1101 strip off the D/L and user group parts of the header to associate with the index. The user group is used by the scheduler function. The loading of the output processes 1102 is controlled by the scheduler 1107. The downlink hop position is derived from the D/L address and inserted ahead of the cell. Beam steering is controlled by the modulators 807, shown in FIG. 8*a*, based on this information. In the downlink router, there is no S-stage interface function. For multi-cast traffic, the D/L address is decoded into its equivalent single cast addresses using an address definition table. A count parameter is set according to the number of such addresses generated. The scheduler then places the index in each of the appropriate queues. The index is only released to the Free queue once all individual queues have returned the [transmitted] index to the scheduler.

The downlink assignment process builds the data traffic portion of the downlink in an optimized fashion to maximize bandwidth usage efficiency. The process is generalized to support hopping beams, with static beams treated as a special case of one hop position per beam. In this process, each downlink frame is pre-built in a dynamic fashion during transmission of the previous frame, with build order based on the mix of traffic currently stored in the downlink buffer. A typical frame format is shown in FIG. 3*c*.

The traffic assigned per frame for a given hop position is aggregated into one contiguous burst (Traffic Cells) preceded by a synchronization preamble (Sync Probes). The length of individual bursts varies to match the data assigned. This gives one downlink carrier burst per hop position per frame, so minimizing the hop switching time overhead and simplifying burst recovery at the terminal. The Sync group is used for maintaining terminal synchronization and is one fixed length burst per hop position containing a sync position plus essential fixed status information (such as frame count). The Traffic group contains the 16,384 data cells. The downlink scheduler pools this section of the frame.

Traffic is assigned to each burst in a prioritized order to match the time criticality of the data. Provision is made to modify this order, with a typical order being (highest priority first):

High priority on-board network signalling (uplink assignment; congestion control etc.)

RT data traffic (arriving in previous frame)*

NRT data traffic (arriving in earlier frames)*

Low priority on-board network signalling

JT data traffic*

Traffic marked with an * is further limited according to User Group capacity ownership on each carrier to preserve VPN characteristics. This uses a similar Area/Segment scheduling approach to the uplink, with two differences:

the Area corresponds to one downlink carrier, rather than a spot (=hop position);

any unused User Group (Segment) capacity in a given frame is added to the Area Pool, and all User Groups have access to the Pool. There is provision for a User Group to accumulate credits for previously unused capacity, to give preferential access to the Pool in subsequent frames.

The distribution of User Group (Segment) traffic between hop positions on a given carrier is determined by the order of arrival of the lowest priority traffic transmitted for that Segment.

Figure 12A:
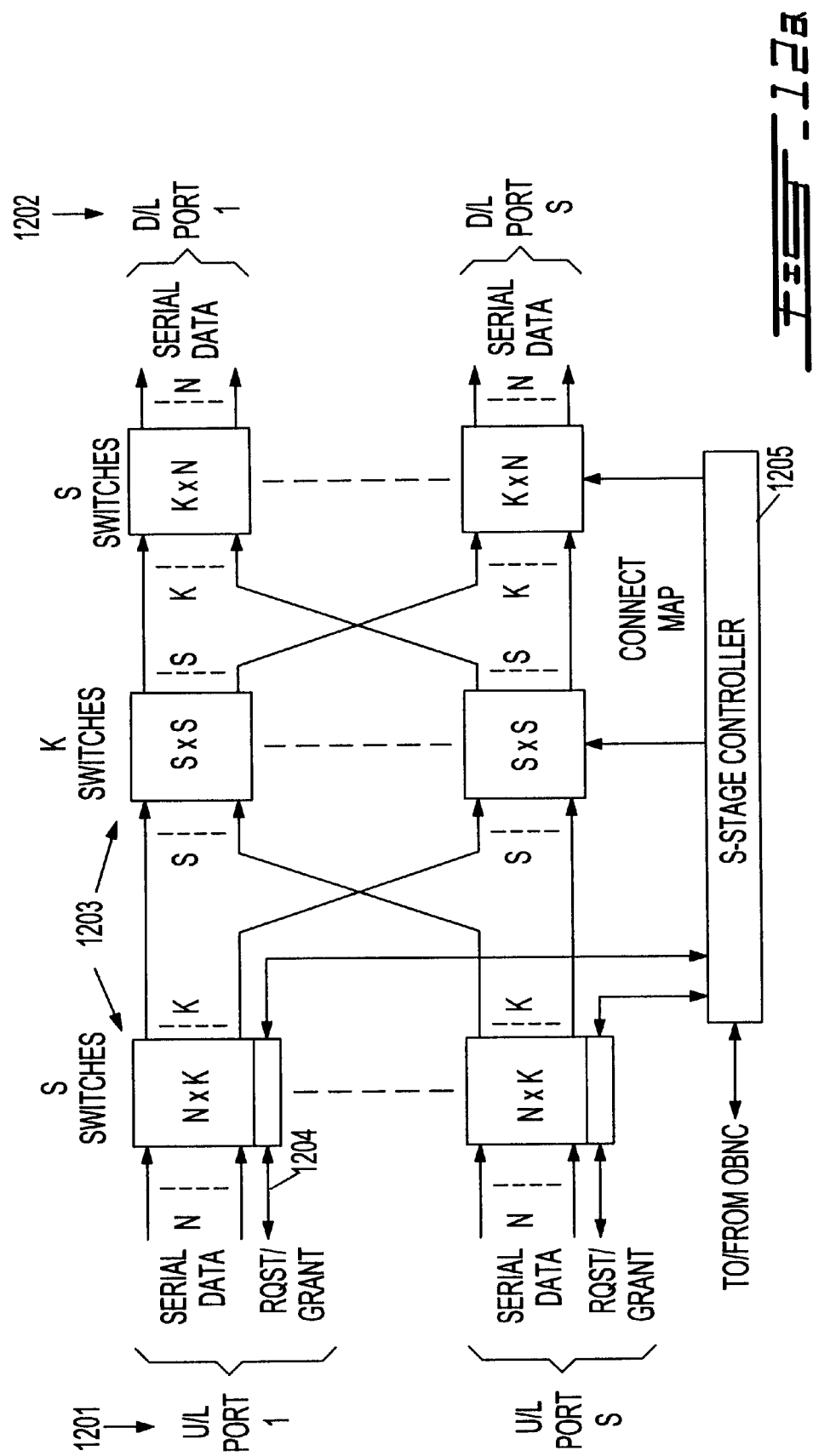
FIG. 12a is a block diagram of the S stage used in the DDSU of FIG. 8b.

Referring now to FIG. 12*a*, we have shown a block diagram of the S stage forming part of the DDSU described with reference to FIG. 8*b*. The S stage provides multiple serial transmission paths from the uplink ports (1-S) shown at reference numeral 1201 and downlink ports (1-S) shown at reference numeral 1202. Multiple cells are routed synchronously in parallel using a TDM-type burst plan as illustrated in FIG. 13a. The switch makes use of a multistage topology to handle the large number of inputs and outputs. The switch is made up of a number of small switch modules 1203, each of which is a full matrix switch of 1 bit wide. The switch dimensions are derived as follows:

being the number of ports, can go up to 32 in number;

N being the serial links per port, can be between 10 and 20 according to the bit rate used (for example, at 40 megabits/second, the number of serial links per port would be 10, whereas the number of links per port at 20 megabits/second would be 20;

K which is the number of intermediate success paths, is less than or equal to 2n−1.

Figure 14:
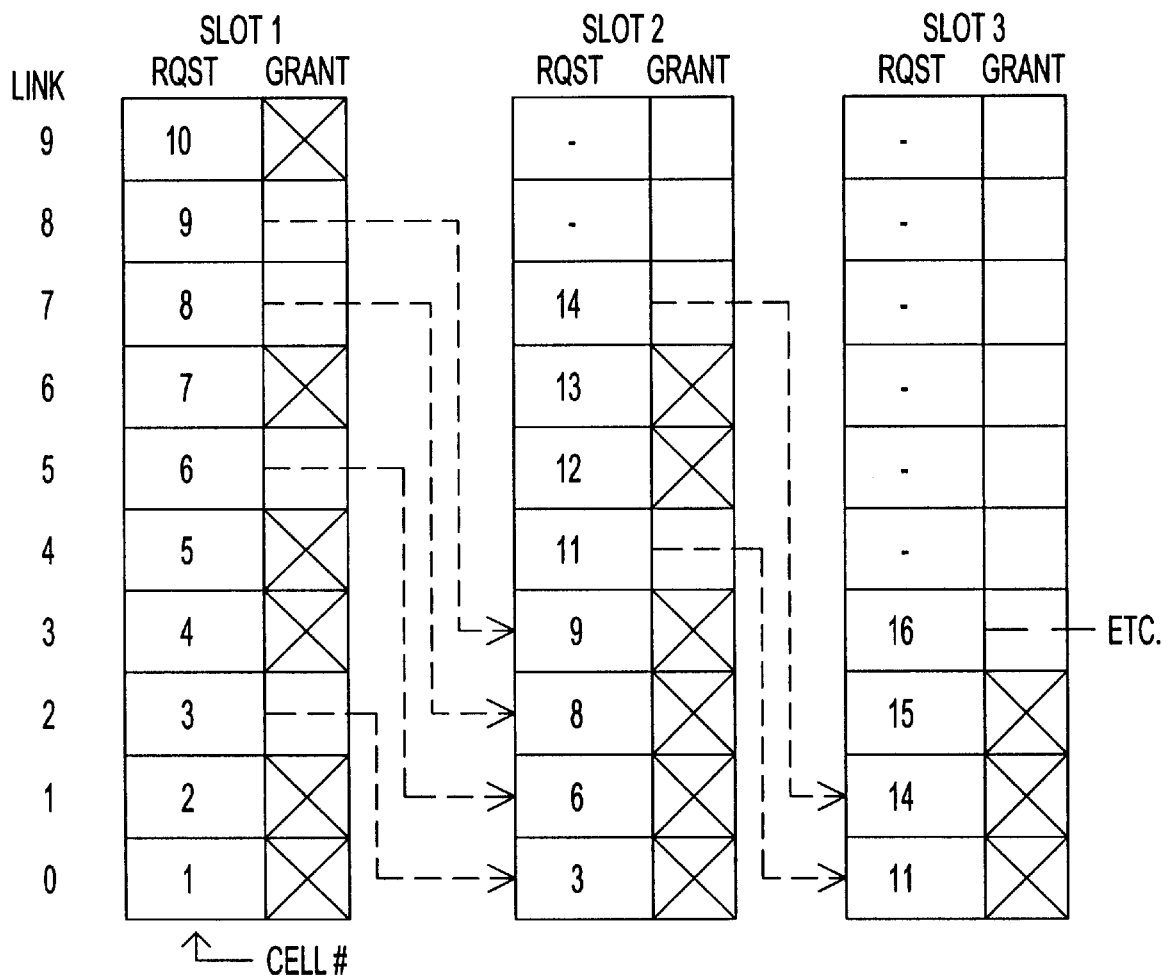
FIG. 14 is a diagram illustrating the S stage request queuing.

Routing over the S stage occurs dynamically every cell transfer slot time, using a protocol sequence such as shown in FIG. 13b. The serial links from any given port are labelled 0–(n−1), with 0 being highest priority and n−1 being the lowest. The scheduler algorithm packs the associated output process queue sequentially from the link 0 upwards, to create a contiguous list of cell transfer requests. Connections set up for a given time slot is done in the preceding slot, in parallel with the transfer of cell data. The protocol is comprised of four phases. Each port serially shifts in the output processor queue destination port addresses for all S stage links. This is done using a bi-directional request/grant line 1204 and the same clock as for cell data transfer clocking. This message comprises a request count value (4 or 5 bits) giving the number of active requests, followed by an 8 bit port address value for each active request, starting with serial link 0 1301 shown in FIG. 13a. The total message length is then a maximum of 165 bits which is equivalent to a fully loaded output processor queue with 20 links, or about 38% of the cell transfer slot. The S stage controller 1205 arbitrates these requests and sets up connections in the inactive half of a ping-pong connect register in each switch module 1203. The controller 1205 then shifts back an n bit grant word on the request/grant line 1204, with one dedicated bit per serial cell data link, again starting with the grant for link 0. The port then preloads the granted output process with the start data for the cell, ready for immediate transmission at the start of the next cell. Any non-granted requests in the port output queue are promoted to fill the highest priority request entries, i.e. those which fall towards link 0, and new cell requests are packed on top of these unsuccessful requests as illustrated in FIG. 14. At the sync time (see FIG. 13b), the new S stage connections are made, the new cell transfers start and the process repeats itself.

Relative link prioritization is determined by the controller arbitration sampling order. The controller arbitrates all link 0 requests first, then all link 1, etc. The switch structure guarantees that all link 0 requests will be granted, most, if not all, link 1 requests, and so on with decreasing probability of success as link number increases. The S stage routing is based around supports for three classes of downlink port addresses. Those are the single cast addresses, global multi-cast addresses and local multi-cast addresses. The single cast addresses are those targeted to a single port, and occupy one path through the S stage. The global multi-cast addresses are used for frequently-used multi-cast transfers, i.e. two multiple ports, and are handled directly by the S stage controller 1205 using a program connection map. Such global multi-cast connections will occupy a number of connect paths through the S stage, and are granted only if the controller 1205 can make all connections at the same time. It is to be noted that the promotion of ungranted requests plus the guaranteed connection of link 0 ensures that such a cell will always get through, even if it takes several slot times. The local multi-cast addresses are handled by the uplink port 1201, by expanding them into an equivalent number of single cast addresses.

Since the address in the uplink cell header is that of a downlink spot, while that required by the S stage is that of a downlink port, there is a mapping function in the uplink port which gets the port address from the spot address. This same mapping function can be used to remap the spot address on the uplink to a downlink port specific address to allow address re-use in big switches.

The connection process is handled by the S-stage controller (FIG. 12b), which samples the uplink port requests, tries to make connections, and sets the grant for those connections successfully made.

In describing the controller operation, the notation BITS (x) is used to denote the number of bits required to address x elements (BITS(x)=⌉$\log_2$x⌈ where ⌉ ⌈ means round up to the next integer).

The connect process can be broken down into three separate processes:

input selection (1 of n) in the first bank of switches (uplink switch modules)

connect path selection (1 of k for single cast) in the middle bank of switches (connect switch modules)

output selection (1 of n) in the final bank of switches (downlink switch modules).

Input selection is done in a systematic fashion, by the controller Uplink Input Select function selecting all inputs of the same number from all uplink switch modules to form a processing batch. This requires a binary counter of size BITS(n) to define the current input number. Inputs samples early in the count sequence have a higher probability of connection than those samples later, since they see fewer pre-existing connections and hence fewer blocked paths. This gives the link prioritization characteristic referred to above.

The requests (downlink port addresses) for each uplink port are stored in the associated uplink switch module, and that associated with the currently selected input is transferred to the S-stage controller at the start of batch processing.

In principle, all uplink switch modules transfer the currently selected requests in parallel using one clock cycle. However, in large switches this can result in excessive signal counts, and practical implementations may need to reduce the number of wires by performing the transfer in several cycles (either by shifting each request in several serial symbols or by transferring a sub-group of port modules at a time).

Referring to FIGS. 12a and 12b, it can be seen that each of the s inputs and outputs of the k connect switch modules is dedicated to one of the s U/L and D/L switch modules respectively. A k wide bit mask is defined for each U/L switch module, where a '1' indicates that the associated output to a connect switch module input is not used. A similar mask is defined for each D/L switch module to indicate that the associated input from a connect switch module is not used. Each of the switch modules is a matrix switch, so each input of a module switch is guaranteed of being connected to any of its outputs (or combination of outputs) without blocking. This means that where the same bit is at a '1' in both an U/L switch module and a D/L switch module mask, then they can be connected via the associated connect switch module.

For a single cast connection, a free path is located (in the Connection Arbitration function) by AND'ing together the k bit output mask of the uplink switch module with the k bit input mask of the addressed downlink switch module to locate any bit at '1' in each. This bit then selects which of the k middle switches to use. The connection load can be done in one clock cycle by sending a connect vector to all affected switch modules, this connect vector being the k value to each of the uplink and downlink switch modules involved, plus the two s values of the uplink and downlink to the selected connect module. The connection is then registered by clearing the appropriate U/L and D/L mask register bits. Loading the connection into the U/L module causes it to set the appropriate Grant bit in the reply to the U/L port, and makes the connection between the selected input and the connect path output. Similarly, loading the connection into the D/L module causes it to make the connection between the connect path input and the selected output.

Since loading one connection per clock cycle requires $s^2$ cycles in the worst case, this can require too much time for large s, so a practical connection arbitrator 1208 does a full processing batch (s D/L Addresses) in parallel. This is done by decoding each downlink port address into an s bit select mask, where each bit corresponds to a demand for the associated downlink port. This mask is then used to perform s×k bit mask comparisons in parallel to create s sets of connect vectors. Since more than one of these parallel connection attempts might be targeted at the same downlink, the arbitrator contains a priority chain to override the D/L mask bit corresponding to a connection already made to that D/L higher in the chain.

The second impact of such parallel processing is that a given connect or D/L switch module may be involved in more than one connection, requiring multiple clock cycles to load the connection vector components to that module. To avoid this load process slowing down the total connect build, the arbitrator must provide a queue storage of these vector components 1209, so that the arbitration of the next processing batch can continue in parallel with the vector load process. This is shown schematically in FIG. 12*b* (the U/L queue shown is not required for the single cast case since there is only ever one connect per U/L per processing batch).

In the single cast connection, the address decode is a simple binary decode, with only one bit of the s bit select mask set. The extension to a global multi-cast connection involves changing this decode to generate an s bit mask with multiple bits set, corresponding to the multiple D/L ports addressed. To limit complexity, the single cast connections are still handled by a binary decode, while the multi-cast masks are derived from a preloadable look-up table.

The connection arbitrator is an enhancement of that used for single cast, in which a multi-cast path is only made if a connect can be made for each addressed D/L port. This is done by comparing the select mask with the composite s bit value made up of the AND of the U/L switch module mask with each of the s D/L switch module masks.

Since a multi-cast connection can require more than one connection at the uplink module, we require an U/L module connect queue 1210. This has two further impacts:
the input select value may have gone out of context by the time the connection is loaded (i.e. the controller may have selected another input batch for processing), so the U/L connection vector component in the queue must be extended to include the input select value;
the connect load process may extend beyond the time at which the module must start transferring the Grant value back to the U/L port, so the load pulse cannot be used to set the Grant bit. Instead, a dedicated "Input Granted" signal is sent from Controlled to U/L switch module during the batch processing of that input.

Output selection is performed within each of the D/L switch modules 1211 by assigning connections, sequentially, using a BITS(n) counter. This count is increased by one each time a connection is made to that module.

When all outputs of a downlink switch module have been connected, the S-stage controller is inhibited from making any further connections to that module (e.g. by resetting the associated k bit mask register). Since the connections are queued in the controller, the connect process cannot rely on the D/L switch module count being current, so a similar connect count is maintained in the controller.

Referring now to FIG. 15, we have shown a block diagram of the on-board network controller shown at reference numeral 805 of FIG. 8*a*. The OBNC is based on a Reduced Instruction Set Computer (RISC) type processor. A serial fibre optic bus 1500 is used to provide command and telemetry interfaces to all payload equipment other than the DDSU interface 1501. Access to the payload equipment on serial fibre optic bus 1500 is done via the Remote Terminal Units (RSUs) interface 1502, at a rate of 1–5 megabit/second. For the DDSU interface 1501, there are two interface classes, a high-speed control monitor bus 1503 for controlling the DDSU, and a simulated uplink/downlink connection 1504 for routing network management cells between the OBNC and the DDSU.

Congestion control is used to avoid excessive cell loss on JT traffic while providing an acceptable transport delay. The strategy uses four levels of control:
RT and NRT traffic admission control. This controls the admission of new calls to maintain a minimum amount of capacity for JT traffic on the downlink. This is combined with a similar function applied to the uplink, to provide enough throughput capacity to meet the desired JT transport delay performance. This control is implemented by the NCC according to limits defined by the User Group operator.
A flow buffer (on-board cell storage) is used to absorb transient peaks in the JT traffic profile. As shown in FIG. 16, this buffer is partitioned into a dedicated capacity per User Group plus a common overflow capacity, to provide acceptable decoupling between the User Group load profiles within a practical on-board buffer size. Multiple downlinks share a common buffer to maximize the statistical gain across downlinks, subject to practical hardware limitations.
Flow control to reduce or stop JT transmission to a downlink when it becomes congested. This uses two features:
The feedback to all terminals in that User Group, of two on-board parameters per downlink User Group, namely the proportional fullness of the flow buffer serving that downlink and the proportion of the User Group downlink carrier capacity which is assigned to RT or NRT traffic. Both parameters are quantized as a 2 bit (4 level) value, with the transition levels between binary states programmable. Provision is made to provide a measurement of the absolute flow buffer fullness to the NCC for other flow control strategies.
A windowing algorithm in each terminal to control the JT flow based on the parametric feedback plus other information from the NCC.
Selective re-transmit ARQ is used to recover buffer overflow losses with a minimal cell re-transmission load.

Emphasis has been placed on providing a flexible and non-constraining environment for the application of different congestion control strategies. In particular, software based control algorithms are used as much as possible to allow compliance with future terrestrial congestion control standards and/or adaption to advanced algorithms still under development.

Typical Call Scenario

The system supports a multimedia service for both residential and business terminals, integrated into the terrestrial networks. In general, this service also consists of single media applications including constant bit rate (CBR) voice/ video and highly bursty interLAN data, hypertext and images. Three types of network interfaces cover these applications: TCP/IP, B-ISDN, N-ISDN. Of these three, TCP/IP is the communications protocol for the Internet, which is the primary application to be supported. The description of the general composition of the network interface using TCP/IP as an example is given below followed by a typical call scenario over the satellite system.

In an on-board processing satellite architecture, the call is supported by a single hop bearer service, while call signalling is processed by the Network Control Center (NCC) station. The satellite in general supports independent subnetworks referred to as user groups which each subscribe to some portion of the satellite resources. That resource is allocated to the user terminals by the NCC for that user group. The overall allocation of the satellite resource amongst user groups and interuser group communications is controlled by the Network Operations Centre (NOC).

In general depending on the size of the user group and the amount of traffic routed to the terrestrial public/private network, the NCC function may be collocated with a Gateway terminal which supports a high rate feederlink.

The handling of calls is part of the overall interface of the satellite system to the (terrestrial) communications protocol. In general the satellite system serves as a subnetwork (of the Internet), therefore supporting the communications aspect up to the Network layer 3 of the OSI (Open System Interconnection) model. For the TCP/IP protocol this is the IP layer; the transport (OSI layer 4) protocol TCP is transferred between the end user application transparently over the satellite system. The first three layers of the OSI model are the physical, data link and network layers. The general functions performed by each of these layers are listed in the table below for the terrestrial protocol (user side) and the satellite protocol. Depending on the specific terrestrial protocol, some degree of conversion and emulation is in general required to adapt to geostationary space transmission characteristics.

Protocol Stack

| OSI Layer | Terrestrial Function | Satellite Function |
|---|---|---|
| Network | IP (Internet Protocol) Adaptation sublayer | IP Address conversion Call establishment |
| Data Link | Convergence sublayer media access control cell formatting (segmentation & reassembly) | Uplink and downlink multi-access protocol Formatting of satellite cells Link end-to-end error and flow control Link establishment |
| Physical | Internet Sonet LAN | MF-TDMA Primary Access Modulation & Coding Ka band RF transmission Beam coverage |

An entire call scenario proceeds in essentially four main steps listed below starting with the terminal logging onto the network, if not already logged on, followed by the call establishment procedure itself:
1) network login:
2) satellite resource access and call setup signalling,
3) call transmission, and
4) call teardown and satellite resource release.

These steps are described below.

The first step following power-up of the terminal is to initiate a network login (either automatically or by manual control) to be admitted into the system and be ready to handle traffic. This state is referred to as Logged-on.

The login procedure consists of four steps:
1) terminal acquires downlink (receiver) synchronization,
2) terminal sends log-on request to the network, in a Common Signalling Channel (CSC) using S-ALOHA random access slot(s),
3) if the log-on request is accepted the terminal acquires uplink (transmitter) synchronization using coarse and fine sync procedure and is assigned a synchronization slot, and
4) terminal registers with network management.

The detailed procedure is given below.

1. The UTS acquires DownLink (D/L) synchronization using the unique word in the frame sync probe which is broadcast by the satellite to each beam at the start of each frame. For the hopping beam group, the hop position offset of the sync probe is determined using the hop position identifier in the probe. One bit in the sync probe indicates whether or not the network is operational, in which case the UTS can proceed.
2. The terminal receives the standard data cell giving House-Keeping (HK) data, and extracts the orbit and link parameters (satellite ephemeris), and the location of the log-on (CSC) slot for its transmit rate and hop beam position.
3. The UTS estimates the satellite range using the HK data plus a knowledge of its own location (latitude, longitude and height above sea level) and uses this to adjust its burst timing for start of uplink frame transmission. Based on a ±0.05 degree satellite stationkeeping accuracy, the resulting timing uncertainty in arrival of data at the satellite is estimated to be ±7 usec.
4. The UTS then sends a log-on request in the CSC slot using S-ALOHA random access. This request contains the terminal absolute ID plus the identification of which user group it is requesting service from. If this is received on board without collision, it will be acknowledged by a status bit in the HK data one round trip later. The terminal retries if there is a collision.
5. If there is a free terminal ID (the system has a free synchronization slot), the NOC (Network Operations Centre) performs the following:
   validates access of that terminal to the requested user group,
   assigns a terminal ID and slots for coarse and fine synchronization,
   send a message to the terminal containing the above assignments and other information needed to complete log-on such as frequency/rate assignments and VCI for log-on registration.

The coarse sync probe assignment will be one probe every multiframe (16 frames or 384 msec) for a fixed number of multiframes adequate to achieve fine sync capture. The fine sync probe assignment is permanent for the duration of the connection, and is also for one probe every multiframe.

6. The UTS then performs coarse UpLink (U/L) burst timing synchronization using a closed loop technique. In this method, the terminal sends a probe pattern at its reserved coarse sync time slot, the onboard processor measures the timing error of the probe burst relative to an onboard reference, and then sends this information back. The UTS then adjusts its timing to match and retries. This process continues until the timing is within the fine sync capture range of one symbol period.

7. The UTS then performs fine closed loop U/L timing synchronization by generating a probe burst in the fine sync time slot. The onboard processor measures the clock phase timing error against the onboard reference and transmits this information to the UTS. The UTS then adjusts its timing clock phase until fine synchronization of approximately 1/40th of the symbol period is achieved, upon which the UTS transitions to sync maintenance mode for the remainder of the connection time.
8. Once in sync maintenance mode, the UTS uses the piggy back request channel in the fine sync probe to request capacity for a registration message to the overall system NOC and the user group NCC network management and control stations.

Once the terminal is logged on, it is ready to respond to source traffic according to the type of connection required. In general, the connection is established in three steps:
1) first accessing satellite capacity to transmit call setup signalling
2) transmission of call setup signalling
3) access of satellite capacity to support the connection.

The manner in which these steps are performed depends on the type of traffic. Three types of capacity, listed below, are accessible to a terminal according to the traffic type.

Real Time (RT) Capacity
Jitter Tolerant Capacity (JT)
Free Capacity (FC).

The detailed procedure for the access of capacity is governed by the uplink multi-access protocol and downlink scheduler described above. The procedure for the call setup are given below for RT and JT traffic.
1. For RT traffic the initial access of uplink capacity is for the transmission of call setup signalling packets from the user terminal to the NCC of its user group. This utilizes either previously reserved capacity, or new capacity from the uplink access protocol.
2. The uplink access protocol provides new capacity by two mechanisms: free capacity or explicit request over the fine synchronization probe transmitted every multiframe (384 msec.). The amount and frequency of distribution of the free capacity is dependent on the size of the logged on terminal population and the traffic loading in that user group at any time.
3. To complete call setup the required satellite resource is allocated for the call. For this class of traffic, admission control is required to allocate the necessary bandwidth on both downlink and uplink before a call can be accepted. For RT traffic the downlink capacity is 100% guaranteed or reserved.
4. The successful completion of the call setup signalling at the satellite subnetwork level is the assignment of VCIs (Virtual Circuit Identifiers) to the terminals for each link through the satellite. This also includes special VCIs allocated for conference calls and broad/narrow casting applications. Each satellite cell which is transmitted or received is identified by the VCI which is incorporated into the routing header.
5. For jitter tolerant (JT) traffic, temporary onboard store and forward operation is permitted. Thus access to the satellite resource involves the request for, and assignment of uplink capacity. Downlink capacity is not allocated as part of admission control as for RT traffic. Instead, the terminal will monitor the congestion status of the satellite including the availability of downlink capacity and onboard buffer storage for the downlink carrier of the destination terminal. If excessive congestion is present, the terminal will apply flow control to the uplink transmission rate.
6. There are two main types of JT calls: calls which have pre-assigned setup (permanent virtual circuit) and those which require setup on a per call basis.
7. The first type utilizes pre-established links between terminals, with pre-assigned VCIs. This is intended to efficiently support datagram-type applications which involve repetitive but relatively short bursts of information generally configured as relatively unchanging star networks of remote sites to a central processing facility.
8. In general for all other kinds of JT traffic including the Internet application, VCIs are assigned by the NCC as part of the call setup signalling for the type of network interface required.

Once call setup has been completed with the assignment (or pre-assignment) of VCIs and allocation of satellite capacity, the single hop transmission path through the satellite is established between the end users, which are either at remote terminals or in the public/private terrestrial networks. The procedure is given below for both RT and JT traffic.

For both RT and JT traffic, calls are routed through the satellite on a cell-by-cell basis by the onboard fast packet switch according to the information in the routing header. This information includes:
1) the address of the downlink spot beam of the multibeam coverage in which the destination terminal is located,
2) a type indicator which tells the switch the quality of service, i.e. delay and loss requirement for that cell,
3) the uplink capacity required to support the next frame of traffic, and
4) the VCI which identifies to the destination terminal the specific cells addressed to it as part of the setup circuit.

For RT traffic, calls are supported with required minimum cell loss and delay, with the guaranteed capacity on the uplink and downlink. The occupied capacity is updated on a frame-by-frame basis to permit the transmission capacity to dynamically vary according to the variation in the source traffic; hence bandwidth on demand with a 24 msec refresh rate. This permits statistical multiplexing of JT traffic in any unused portion of the guaranteed RT capacity.

For JT traffic, calls are supported with cell loss and delay requirement according to the specific characteristics and priority of this traffic. For JT traffic with pre-established connections using pre-assigned VCIs, the terminal proceeds with transmission without a call setup, while for other JT connections, call transmission commences after VCIs are assigned.

During JT traffic transmission, the terminal receives the congestion status of the satellite and, if congestion is present, reacts by reducing the transmission rate of the JT traffic to the congested downlink carrier.

As for RT traffic, the occupied capacity is updated on a frame-by-frame basis according to the dynamic source traffic loading at the terminal.

On completion of the call, the appropriate teardown signalling for the selected network interface is exchanged and the satellite resource is released.
1) For RT traffic this involves the release of the allocation of uplink and downlink capacity and the VCIs used for the connection.
2) for JT traffic, only the release of the uplink capacity is required and VCIs if these were assigned during call setup.

Rain Countermeasures

With the data communication satellite system of the present invention, rain fade countermeasures are used for uplink and downlink transmissions.

The rain fading environment at Ka-band frequencies has a significant impact on system design and the availability of service which can be achieved. To realize a low cost residential terminal the system design must resort to various rain countermeasures to combat rain fading, where and when it occurs, instead of providing a fixed margin everywhere all the time. The rain fade countermeasures (rfcm) considered for the uplink and downlink are listed and described below.

The rfcm supports a transmission availability of 99.8% for the small residential terminals on both the uplink and the downlink yielding an overall remote-to-remote availability of 99.6%. The private business terminals have an availability of 99.9% on both the up and downlink yielding an overall availability of 99.8%. The links to the gateway are maintained at a slightly higher availability of 99.9% for an overall end-to-end availability of 99.7% for a residential terminal. At the maximum fade depth represented by these availabilities and after the improvement due to rate ½ forward error correction the bit error rate is maintained at better than $10^{-10}$.

Rain Fade Countermeasures

| Countermeasure | Uplink | Downlink |
| --- | --- | --- |
| 1. Rate reduction | 2.048 Mb/s to 512 kb/s | |
| 2. Adaptive Forward Error Correction (AFEC) | RS (64,54) | |
| 3. Uplink Power Control | 0–10 db | |
| 4. Larger terminal antenna | 70 cm–1 m | 70 cm–1 m |
| 5. Larger satellite TX power | | 20,40,80 w |

The first listed rfcm utilizes the reduction of the transmission rate of the terminal from 2.048 Mb/s to the lower rate of 512 kb/s. This is available only to the higher speed residential and the advanced business terminal. This involves the terminal manually switching down to the lower TDMA burst rate. The detection and signalling of the level of uplink rain fading is achieved by one of three alternatives:

1) measurement of the 20 GHz downlink signal fading and application of a scaling factor for 30 GHz fading,
2) measurement of a 30 GHz beacon broadcast by the satellite, or
3) onboard measurement of the uplink signal level of each terminal transmission and signalling of the measured fade level to the individual terminals that are affected.

This countermeasure permits the terminal to maintain the application information rate per satellite cell (16 kb/s), but limits the peak application rate to 512 kb/s.

This countermeasure maintains the required error performance of a user application during rain fading, by increasing the level of error correction coding of the user information carried by a satellite cell, at the expense of a reduction in information throughput per cell. By applying an RS(64, 54) code with 6 bit symbols, to the 48 byte payload of the satellite cell, 60 bits of additional coding are added for 324 bits (40.5 bytes) of user information per cell.

This countermeasure, referred to as adaptive forward error correction (AFEC), is an end-to-end rfcm technique which is transparent to the satellite. In response to a detected level of rain fading on the uplink (see alternative schemes listed in 1)–3) above), the terminal raises a rain flag by turning on a special bit, the "rain bit" in the routing header of a cell. This rain bit signals to the destination terminal that additional FEC coding has been applied to the information content in each cell, therefore requiring that the receiving terminal apply additional decoding to extract the user information.

Depending on the error rate requirements of an application, AFEC can be selectively applied on a cell-by-cell basis. In this way cells which carry realtime applications which may not easily reduce their source rate such as voice communications, would not utilize the AFEC but tolerate higher error rates, while non-realtime applications would. In general greater protection to rain fading can be achieved by employing increased coding with a further reduction in information throughput, subject to satisfactory recovery of the demodulated signal.

This rfcm can be used by the low speed 512 kb/s residential terminal to improve the error performance by 3 dB.

This technique can also be used by the high rate terminal during mild rain events, or in combination with rate reduction.

Uplink power control is required to allow the terminal to operate at a lower power level during clear sky conditions, thereby minimizing off-axis emissions to the adjacent satellite slots. This technique will also be used to adjust the terminal transmit power according to its location in a spot beam, to compensate for the variation of uplink spot beam gain from beam edge to beam centre.

In general the rain environment varies over both time and from one geographic region to another. The previous rfcm are mainly utilized to combat time varying rain fading at a given location. The last two address the increase in rain fading for certain regions of North America, in particular the United States southeast including Florida which experience deeper fading for the same availability than the northeast United States (or southeast Canada). The rfcm for such geographic variation of rain fading is a combination of increased satellite eirp for those regions, and larger terminal antennas. For the very worst fading in Florida, however, a slightly lower availability of service is expected, unless much larger terminal antennas (1.5–2 m) are used. The geographic variation of rain fading over North America is approximated by the Crane model; the current baseline is referenced to a region which is roughly southeast Canada/ northeast United States.

We claim:

1. In a satellite communication system carrying data traffic between a data communication satellite and plurality of ground terminals, a method of allocating bandwidth resources amongst a number of spot beams used by said data communication satellite to establish uplink and downlink communication carriers with said ground terminals, comprising the step:

assigning a predetermined frequency reuse pattern to a number of spot beams forming a geometric configuration of beam groups covering said plurality of ground terminals;

distributing the available bandwidth between each beam group such that a downlink carrier of predetermined bandwidth is shared between spot beams forming said beam group; and allocating a predetermined amount of transmission time on said downlink carrier to each spot beam, according the traffic density and bandwidth requirements of each spot beam.

2. A method as defined in claim 1, wherein said frequency reuse pattern of said spot beams is assigned to reduce co-polarized and cross-polarized interference between each beam.

3. A method as defined in claim 2, wherein said interference is reduced by configuring said spot beams within a beam group configuration such that the maximum number of simultaneous and co-polarized co-channel spot beams which are adjacent and one beamwidth away is reduced to a minimum.

4. A method as defined in claim 1, wherein the uplink carrier bandwidth is made up of a multi-frequency (MF) TDMA group of carriers.

5. A method as defined in claim 4, wherein the uplink carrier bandwidth is distributed in an integral number of carriers with a minimum capacity of one carrier in each spot beam.

6. A method as defined in claim 1, wherein said downlink carrier bandwidth associated with a beam group is allocated using a single TDM carrier which is dynamically hopped to a selected spot beam for a variable duration.

7. A method as defined in claim 6, wherein each beam group supports two independently switched carrier bandwidth allocations separated by both polarization and frequency.

8. A method as defined in claim 7, wherein said RF signals associated with said two independently switched carrier bandwidth allocations are multiplexed into one spot beam by means of septum polarization couplers.

9. A method as defined in claim 5, wherein a beam group is comprised of four spot beams.

10. A method as defined in claim 9, wherein a four frequency reuse plan is used for a four beam group.

11. A method as defined in claim 10, wherein each uplink carrier is provided with a 65.536 Mbps bandwidth which is time shared between a group of 4 spot beams using a reprogrammable burst-time plan.

12. A method as defined in claim 11, wherein the bandwidth of each uplink carrier is distributed between beam spots in a group by distributing 32 carriers of 2.048 Mbps MF-TDMA between 4 spot beams of a beam group.

13. A method as defined in claim 12, wherein an uplink variant of 512 kbps is provided by dividing one or more 2.048 Mbps MF-TDMA carriers into 4×512 kbps carriers, each representing a part of an MF-TDMA format.

14. An improved satellite communication system for carrying data traffic between a data communication satellite and a plurality of ground terminals, each ground terminal being operable in a spot beam for communicating with said data communication satellite over uplink and downlink carriers, wherein the improvement comprises:
   each ground terminal being operable to communicate with said data communication satellite via an uplink MF-TDMA carrier having a signal bandwidth which is distributed pseudo-statically in an integral number of carriers with a minimum capacity of one carrier in each spot beam; and
   each ground terminal being operable to communicate with said data communication satellite via a downlink TDM cell burst which vary dynamically in length from frame to frame according to the traffic requirements of each spot beam.

15. An improved satellite communication system as defined in claim 14, wherein each beam group supports two independently switched carrier bandwidth allocations separated by both polarization and frequency.

16. An improved satellite communication system as defined in claim 15, wherein RF signals associated with said two independently switched carrier bandwidth allocations are multiplexed into one spot beam by means of septum polarization couplers.

17. An improved satellite communication system as defined in claim 16, wherein a beam group is comprised of four spot beams.

18. An improved satellite communication system as defined in claim 17, wherein a four frequency reuse plan is used for a four beam group.

19. An improved satellite communication system as defined in claim 18, wherein each uplink carrier is provided with a 65.536 Mbps bandwidth which is time shared between a group of 4 spot beams using a reprogrammable burst-time plan.

20. An improved satellite communication system as defined in claim 19, wherein the bandwidth of each uplink carrier is distributed between beam spots in a group by distributing 32 carriers of 2.048 Mbps MF-TDMA between 4 spot beams of a beam group.

21. An improved satellite communication system as defined in claim 20, wherein an uplink variant of 512 kbps is provided by dividing one or more 2.048 Mbps MF-TDMA carriers into 4×512 kbps carriers, each representing a part of an MF-TDMA format.

22. In a satellite communication system for carrying data traffic between a source terminal and a destination terminal via a data communication satellite having an on-board switching system, a method of routing data cells through said on-board switching system, comprising:
   receiving, at said on-board switching system, a data packet from said source terminal, a data cell within said packet having an information field and traffic routing fields, said traffic routing fields comprising at least a downlink address designating one of a plurality of downlink carriers, and a Virtual Circuit Identifier (VCI) identifying at least one physical address of one of said destination terminal;
   transmitting said received data packet to an appropriate downlink carrier specified by said downlink address without translation at said switching system;
   receiving at said destination terminal, said data cells; and
   identifying if said data cells are applicable to said destination terminal using said VCI from said traffic routing fields, wherein said VCI comprises one of a single cast VCI directed to a specific terminal, a multi-cast VCI directed to more than one terminal, or a broadcast VCI directed to all terminals.

23. A method as defined in claim 22, wherein said downlink address is deleted from said data cell before transmission to said destination terminal.

24. A method as defined in claim 22, wherein said downlink address comprises one of a single cast address directed to a specific downlink spot, a multi-cast address directed to more than one downlink spot, or a broadcast address directed to all downlink spots.

25. A method as defined in claim 1, wherein satellite uplink capacity, downlink capacity and on-board data storage can be partitioned between User Groups to minimize the impact of traffic load variations of one user group on other user groups, and vice versa.

26. A method as defined in claim 22, wherein said received data cell is transmitted to an appropriate downlink address by determining from said downlink address, a transmission circuit associated with the identified downlink address.

27. A method as defined in claim 22, wherein a data cell is determined to be applicable to a destination terminal if the VCI carried with said data cell matches a VCI stored at the destination terminal.

28. In a satellite communication system for carrying data traffic between a source terminal and a destination terminal via a data communication satellite having an on-board switching system, a method of scheduling cell priority of data cells carried on a downlink carrier established between said data communication satellite and said destination terminal, comprising:

receiving, at said on-board switching system, a data cell from said source terminal, said data cell having a cell type field indicative of cell priority to be allocated to the received data cell, said cell priority corresponding to one of a plurality of cell priority categories used in said on-board switching system;

placing said data cell on an appropriate cell priority queue according to said cell priority to be used in said on-board switching system, wherein said placing is translation-free; and transmitting said received data cell from said appropriate cell priority queue via an appropriate downlink carrier to a destination terminal according to the cell priority identified with said data cell and used by said on-board switching system.

29. A method as defined in claim 28, wherein said cell type field comprises one of a null data type, a real time data type, a near real time/loss tolerant type or a jitter tolerant/Minimal loss type.

30. In a satellite communication system for carrying data traffic between a source terminal and a destination terminal via a data communication satellite having an on-board switching system, a method of scheduling uplink capacity on a plurality of uplink carrier groups, each comprising one or more carriers, with each uplink carrier group serving groups of at least one said source terminals, comprising:

receiving, at said on-board switching system, a cell from said source terminal, said cell comprising an Uplink Capacity Request (RQST) indicative that said source terminal is requesting a defined amount of capacity on one of said uplink carrier groups serving said source terminal, whereby to carry Jitter Tolerant (JT) cells;

analyzing said Uplink Capacity Request at said on-board switching system and assigning an assigned capacity to said source terminal;

signaling said assigned capacity to said source terminal on a downlink of said communication system;

said source terminal transmitting on the uplink according to said assigned capacity.

31. A method as defined in claim 30, wherein said assigned capacity is determined based on traffic density of JT cells and Uplink Capacity Request received.

32. A method as defined in claim 30 in which full uplink capacity of the satellite is re-assigned each frame to give bandwidth on demand assignment.

33. A method as defined in claim 30 in which said cell has said Uplink Capacity Request in a field and said cell comprises a data cell.

34. A method as defined in claim 30 in which said signaled assigned capacity is associated uniquely with an uplink slot frequency/time allocation for transmission of traffic, by means of a deterministic algorithm running in each terminal.

35. A method as defined in claim 30 in which said capacity assignment is done in a virtual map space allowing a wide range of flexibility in distribution of uplink capacity across multiple spots, multiple service rates, multiple user groups and multiple uplink access schemes.

36. A method as defined in claim 35 in which the method of capacity assignment can be modified by ground command to suit different uplink access schemes, including MF-TDMA, TDMA, TDM, FDMA, and CDMA, and including the capability of disabling bandwidth on demand where this is required by the service characteristics of the uplink access scheme.

37. A method as defined in claim 28 in which the full downlink capacity is re-assigned each frame to give bandwidth on demand assignment.

38. A method as defined in claim 37 in which said assignments are organized into contiguous bursts, one per hop position and each with a carrier and bit timing recovery preamble, so as to minimize hop time overheads and simplify data demodulation at the receiving terminals.

39. A method as defined in claim 38 in which said hop bursts are varied in duration from frame to frame to match the relative traffic demand to each hop position and maximize downlink bandwidth utilization.

40. A method as defined in claim 25 in which said user groups can be commercial service providers, private business networks or any other logically connected group of terminals forming a stand-alone network.

41. A method as defined in claim 40 in which each such user group has its own network management entity, through which it controls the service offering of terminals belonging to the user group.

42. A method as defined in claim 41 in which each terminal using the satellite belongs to a single user group and is subject to the management controls of the associated network management entity.

43. A method as defined in claim 42 in which all such network management entites are subject to the overall control of a higher level network management entity, which manages the distribution of satellite resources between network management entities.

* * * * *